US011915216B2

(12) United States Patent
Grassadonia

(10) Patent No.: US 11,915,216 B2
(45) Date of Patent: Feb. 27, 2024

(54) DYNAMICALLY DETERMINING A CUSTOMIZED TRANSACTION FLOW

(71) Applicant: Block, Inc., San Francisco, CA (US)

(72) Inventor: Brian Grassadonia, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/700,241

(22) Filed: Mar. 21, 2022

(65) Prior Publication Data

US 2022/0215363 A1 Jul. 7, 2022

Related U.S. Application Data

(63) Continuation of application No. 16/565,016, filed on Sep. 9, 2019, now Pat. No. 11,301,825, which is a continuation of application No. 14/830,659, filed on Aug. 19, 2015, now Pat. No. 10,410,194.

(51) Int. Cl.
*G06Q 20/10* (2012.01)
*G06Q 20/14* (2012.01)
*G06Q 20/20* (2012.01)
*G06Q 20/32* (2012.01)
*G06Q 50/12* (2012.01)

(52) U.S. Cl.
CPC .......... *G06Q 20/14* (2013.01); *G06Q 20/202* (2013.01); *G06Q 20/327* (2013.01); *G06Q 50/12* (2013.01)

(58) Field of Classification Search
CPC .... G06Q 20/14; G06Q 20/202; G06Q 20/327; G06Q 50/12; G06Q 20/102; G06Q 20/204; G06Q 20/322; G06Q 20/3223; G06Q 20/326; G06Q 20/3278; G06Q 20/40

USPC ......................................................... 705/40
See application file for complete search history.

(56) References Cited

U.S. PATENT DOCUMENTS

| | | | |
|---|---|---|---|
| 5,093,787 | A | 3/1992 | Simmons |
| 5,878,337 | A | 3/1999 | Joao et al. |
| 5,918,216 | A | 6/1999 | Miksovsky et al. |
| 6,260,027 | B1 | 7/2001 | Takahashi et al. |

(Continued)

FOREIGN PATENT DOCUMENTS

| | | |
|---|---|---|
| JP | 2005-182338 A | 7/2005 |
| KR | 10-2008-0053056 A | 6/2008 |
| WO | 2011/153281 A2 | 12/2011 |

OTHER PUBLICATIONS

Final Office Action dated Jul. 1, 2022, in U.S. Appl. No. 17/512,618, of Ng, A.Y, et al., filed Oct. 27, 2021.

(Continued)

*Primary Examiner* — Clifford B Madamba
(74) *Attorney, Agent, or Firm* — Lee & Hayes P.C.

(57) ABSTRACT

Systems and methods are disclosed embodying techniques directed to, in association with a transaction between a payor and a payee, determining a parameter associated with at least one of the payee, payor, or transaction. Methods and systems further include dynamically determining, based on the parameter, a customized transaction flow for the payee, wherein the customized transaction flow comprises a set of operations for completing the transaction. Method and systems are further directed to causing one or more user interfaces corresponding to one or more of the set of operations to be presented via a user device of the payor for execution of the set of operations.

20 Claims, 12 Drawing Sheets

(56) References Cited

U.S. PATENT DOCUMENTS

| | | |
|---|---|---|
| 6,398,646 B1 | 6/2002 | Wei et al. |
| 7,099,850 B1 | 8/2006 | Mann, II et al. |
| 7,182,253 B1 | 2/2007 | Long |
| 7,644,019 B2 | 1/2010 | Woda et al. |
| 7,668,766 B1 | 2/2010 | Goodwin, III et al. |
| 7,693,771 B1 | 4/2010 | Zimmerman et al. |
| 7,693,784 B2 | 4/2010 | Rivest et al. |
| 7,792,717 B1 | 9/2010 | Hankins et al. |
| 7,865,435 B1 | 1/2011 | Medina, III |
| 7,958,050 B2 | 6/2011 | Finch |
| 8,452,654 B1 | 5/2013 | Wooters et al. |
| 8,583,549 B1 | 11/2013 | Mohsenzadeh |
| 8,606,640 B2 | 12/2013 | Brody et al. |
| 8,880,540 B1 | 11/2014 | Sampson et al. |
| 8,965,791 B1 | 2/2015 | Bell et al. |
| 9,665,858 B1 | 5/2017 | Kumar |
| 9,715,689 B1 | 7/2017 | Ellis et al. |
| 9,767,467 B2 | 9/2017 | Gebb et al. |
| 9,934,494 B1 | 4/2018 | Nolte et al. |
| 9,990,621 B1 | 6/2018 | Ng et al. |
| 10,127,532 B1 | 11/2018 | Grassadonia |
| 10,410,194 B1 | 9/2019 | Grassadonia |
| 10,686,781 B1 | 6/2020 | Kaditz et al. |
| 2001/0051902 A1 | 12/2001 | Messner |
| 2002/0010666 A1 | 1/2002 | Wright |
| 2002/0120568 A1 | 8/2002 | Leblang et al. |
| 2002/0120582 A1 | 8/2002 | Elston et al. |
| 2004/0122685 A1 | 6/2004 | Bunce |
| 2004/0248548 A1 | 12/2004 | Niwa et al. |
| 2005/0250538 A1 | 11/2005 | Narasimhan et al. |
| 2006/0006226 A1 | 1/2006 | Fitzgerald et al. |
| 2006/0173908 A1* | 8/2006 | Browning ............ G06Q 10/107 |
| 2006/0178986 A1* | 8/2006 | Giordano ............ G06Q 20/102 705/40 |
| 2006/0208065 A1 | 9/2006 | Mendelovich et al. |
| 2006/0293983 A1 | 12/2006 | Rosenblatt et al. |
| 2007/0106558 A1 | 5/2007 | Mitchell et al. |
| 2007/0198403 A1 | 8/2007 | Aloni et al. |
| 2007/0233615 A1 | 10/2007 | Tumminaro |
| 2007/0244811 A1 | 10/2007 | Tumminaro |
| 2007/0255564 A1 | 11/2007 | Yee et al. |
| 2007/0255652 A1 | 11/2007 | Tumminaro et al. |
| 2007/0255662 A1 | 11/2007 | Tumminaro |
| 2007/0267479 A1 | 11/2007 | Nix et al. |
| 2008/0040261 A1 | 2/2008 | Nix et al. |
| 2008/0114699 A1 | 5/2008 | Yuan et al. |
| 2008/0215472 A1 | 9/2008 | Brown |
| 2009/0094123 A1 | 4/2009 | Killian et al. |
| 2009/0157555 A1 | 6/2009 | Biffle et al. |
| 2009/0198528 A1 | 8/2009 | Kahn |
| 2009/0240626 A1 | 9/2009 | Hasson et al. |
| 2009/0327123 A1 | 12/2009 | Wolfson |
| 2010/0010906 A1 | 1/2010 | Grecia |
| 2010/0121745 A1 | 5/2010 | Teckchandani et al. |
| 2010/0161457 A1 | 6/2010 | Katz et al. |
| 2010/0161484 A1 | 6/2010 | Leggatt et al. |
| 2010/0191570 A1 | 7/2010 | Michaud et al. |
| 2010/0205091 A1 | 8/2010 | Graziano et al. |
| 2010/0257081 A1 | 10/2010 | Ritchie |
| 2010/0306029 A1 | 12/2010 | Jolley |
| 2010/0306094 A1 | 12/2010 | Homer et al. |
| 2010/0306103 A1 | 12/2010 | Hankins et al. |
| 2011/0016536 A1 | 1/2011 | O'Brien et al. |
| 2011/0106668 A1 | 5/2011 | Korosec et al. |
| 2011/0145049 A1 | 6/2011 | Hertel et al. |
| 2011/0191241 A1 | 8/2011 | Blain et al. |
| 2011/0201306 A1 | 8/2011 | Ali Al-Harbi |
| 2011/0238473 A1 | 9/2011 | Sankolli et al. |
| 2011/0246306 A1 | 10/2011 | Blackhurst et al. |
| 2011/0251910 A1 | 10/2011 | Dimmick |
| 2011/0276418 A1 | 11/2011 | Velani |
| 2011/0288922 A1 | 11/2011 | Thomas et al. |
| 2011/0313871 A1 | 12/2011 | Greenwood |
| 2012/0016799 A1 | 1/2012 | Killian et al. |
| 2012/0041875 A1 | 2/2012 | Sorbe et al. |
| 2012/0078784 A1 | 3/2012 | Anthony et al. |
| 2012/0130903 A1 | 5/2012 | Dorsey et al. |
| 2012/0143761 A1 | 6/2012 | Doran et al. |
| 2012/0158443 A1 | 6/2012 | Kim |
| 2012/0166332 A1 | 6/2012 | Naaman |
| 2012/0191607 A1 | 7/2012 | Lord et al. |
| 2012/0226545 A1 | 9/2012 | Gebb et al. |
| 2012/0239483 A1 | 9/2012 | Yankovich et al. |
| 2012/0253906 A1 | 10/2012 | Lapica |
| 2012/0271712 A1 | 10/2012 | Katzin et al. |
| 2013/0024289 A1 | 1/2013 | Cueli et al. |
| 2013/0030934 A1 | 1/2013 | Bakshi et al. |
| 2013/0132274 A1 | 5/2013 | Henderson et al. |
| 2013/0179346 A1 | 7/2013 | Kumnick et al. |
| 2013/0304576 A1 | 11/2013 | Berland et al. |
| 2013/0317893 A1 | 11/2013 | Nelson et al. |
| 2014/0012689 A1 | 1/2014 | Henderson et al. |
| 2014/0012701 A1 | 1/2014 | Wall et al. |
| 2014/0012743 A1 | 1/2014 | Hanson et al. |
| 2014/0095385 A1 | 4/2014 | Ainslie et al. |
| 2014/0100931 A1 | 4/2014 | Sanchez et al. |
| 2014/0156517 A1 | 6/2014 | Argue et al. |
| 2014/0164082 A1 | 6/2014 | Sun et al. |
| 2014/0249999 A1 | 9/2014 | Johnson et al. |
| 2014/0279098 A1 | 9/2014 | Ham |
| 2014/0297533 A1 | 10/2014 | Mittal |
| 2014/0351118 A1 | 11/2014 | Zhao |
| 2014/0358769 A1 | 12/2014 | Howe et al. |
| 2014/0365304 A1 | 12/2014 | Showers et al. |
| 2015/0012388 A1 | 1/2015 | Kim et al. |
| 2015/0046271 A1 | 2/2015 | Scholl et al. |
| 2015/0081534 A1 | 3/2015 | Zamer |
| 2015/0100442 A1 | 4/2015 | Van Heerden et al. |
| 2015/0100443 A1 | 4/2015 | Van Heerden et al. |
| 2015/0112870 A1 | 4/2015 | Nagasundaram et al. |
| 2015/0127392 A1 | 5/2015 | Shivakumar et al. |
| 2015/0161741 A1 | 6/2015 | Unser et al. |
| 2015/0170132 A1 | 6/2015 | Patel |
| 2015/0186863 A1 | 7/2015 | Schwalb et al. |
| 2015/0186871 A1 | 7/2015 | Laracey |
| 2015/0220914 A1 | 8/2015 | Purves et al. |
| 2015/0220924 A1 | 8/2015 | Bakker |
| 2015/0287006 A1 | 10/2015 | Hunter et al. |
| 2015/0287021 A1 | 10/2015 | Itwaru |
| 2015/0287067 A1 | 10/2015 | Robeen |
| 2015/0294339 A1 | 10/2015 | Vargas et al. |
| 2015/0348003 A1 | 12/2015 | Reader |
| 2016/0012428 A1 | 1/2016 | Haldenby et al. |
| 2016/0034906 A1 | 2/2016 | Stopic et al. |
| 2016/0055474 A1 | 2/2016 | Syed |
| 2016/0104237 A1 | 4/2016 | Kanjlia et al. |
| 2016/0117910 A1 | 4/2016 | Rajala |
| 2016/0148164 A1 | 5/2016 | Luk et al. |
| 2016/0224972 A1 | 8/2016 | Li |
| 2016/0364724 A1 | 12/2016 | Wang et al. |
| 2017/0161698 A1 | 6/2017 | Caldwell |
| 2020/0097934 A1 | 3/2020 | Brian |
| 2022/0051222 A1 | 2/2022 | Ng et al. |

OTHER PUBLICATIONS

"Billr: Bill Splitting at the Table," Billr, iTunes Preview, Retrieved from the internet URL: https://itunes.apple.com/us/app/billr-bill-splitting-attable/id501889312?ls=l&mt=8, on Nov. 4, 2014, pp. 1-2.

"Divvy on the App Store on iTunes," iTunes, Helix Interactive, Retrieved from the internet URL: https://itunes.apple.com/us/app/divvy/id560503890?ls= 1 &mt=8, on Nov. 4, 2014, pp. 1-2.

European Patent Office; "EPO Summary of Arguments", Minutes of the Oral Proceedings before the Examining Division; Sep. 22, 2015; Munich, DE.

"Sharing bills & expenses?," WeSplit.It., Retrieved from the internet URL : https://wesplit.it/, on Nov. 4, 2014, pp. 1-2.

"Split bills, share rent & expenses for your sharehouse or holiday, The best way to split bills," dapShare, Retrieved from the internet: URL<http://dapshare.com/, on Nov. 4, 2014, pp. 1-2.

"Split expenses with friends," Splitwise, Retrieved from the internet URL: https://www.splitwise.com/, on Nov. 4, 2014, pp. 1-2.

(56) References Cited

OTHER PUBLICATIONS

"Splitabill," Funkbit AS, iTunes Preview, dated Oct. 15, 2012, Retrieved from the internet URL: https://itunes.apple.com/us/app/splitabill/id485048203, on Nov. 4, 2014, pp. 1-2.
"splitabill.com: Take a tour," Splitabill, Retrieved from the internet URL: https://splitabill.com/tour/, on Nov. 4, 2014, pp. 1-2.
"Splitwise," Google Play, dated Oct. 15, 2014, Retrieved from the internet URL: ttps://play.google.com/store/aoos/details?id=com.Splitwise.SplitwiseMobile, on Nov. 4, 2014, pp. 1-2.
"The quickest way to split a bill and calculate the tip at restaurants and bars," Billr.me, Retrieved from the Internet URL: http://billr.me/, on Oct. 29, 2015, pp. 1-4.
"What is Divvy?," Divvy That Up, dated Sep. 17, 2013, Retrieved from the internet URL: http://www.divvythatup.com/, on Nov. 4, 2014, pp. 1-5.
Dodd, A., "dapShare Mobile—Andriod Apps on Google Play," dated Nov. 23, 2011, Retrieved from the internet URL: https://play.google.com/store/apps/details?id=com.dapshare&h1=en, on Nov. 4, 2014, pp. 1-2.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
"Adyen Announces European Availability of Chip & PIN Mobile Point-of-Sale Solution," Business Wire, dated Dec. 3, 2012, Retrieved from the Internet URL: https://www.businesswire.com/news/home/20121203005476/en/Adyen-Announces-European-Availability-Chip-PIN-Mobile, pp. 1-4.
"MeDeploy Launches a New Approach to Digital Pay-Media Distribution at DEMOfall 08," Science Letter, published Sep. 23, 2008, pp. 1-2.
Non-Final Office Action dated Jul. 6, 2016, in U.S. Appl. No. 14/838,246, of Grassadonia, B., filed Aug. 27, 2015.
Non-Final Office Action dated Aug. 29, 2016, for U.S. Appl. No. 14/830,662, of Grassadonia, B., filed Aug. 19, 2015.
Final Office Action dated Nov. 7, 2016, in U.S. Appl. No. 14/838,246, of Grassadonia, B., et al., filed Aug. 27, 2015.
Final Office Action dated Mar. 6, 2017, for U.S. Appl. No. 14/830,662, of Grassadonia, B., filed Aug. 19, 2015.
Advisory Action dated Apr. 24, 2017, for U.S. Appl. No. 14/838,246, of Grassadonia, B., et al., filed Aug. 27, 2015.
Non-Final Office Action dated Jun. 7, 2017, for U.S. Appl. No. 14/664,766, of Ng, A.Y., et al., filed Mar. 20, 2015.
Advisory Action dated Jun. 26, 2017, for U.S. Appl. No. 14/830,662, of Grassadonia, B., filed Aug. 19, 2015.
Final Office Action dated Sep. 14, 2017, for U.S. Appl. No. 14/664,766, of Ng, A.Y., et al., filed Mar. 20, 2015.
Non-Final Office Action dated Oct. 24, 2017, for U.S. Appl. No. 14/664,781, of Ng, A.Y., et al., filed Mar. 20, 2015.
Non-Final Office Action dated Nov. 8, 2017, for U.S. Appl. No. 14/830,662, of Grassadonia, B., filed Aug. 19, 2015.
Non-Final Office Action dated Nov. 13, 2017, for U.S. Appl. No. 14/838,246, of Grassadonia, B., et al., filed Aug. 27, 2015.
Non-Final Office Action dated Nov. 17, 2017, for U.S. Appl. No. 14/830,659, of Grassadonia, B., filed Aug. 19, 2015.
Notice of Allowance dated Feb. 5, 2018, for U.S. Appl. No. 14/664,766, of Ng, A.Y., et al., filed Mar. 20, 2015.
EIC 3600 Search Report dated Feb. 5, 2018, for U.S. Appl. No. 14/664,766, of Ng, A.Y., et al., filed Mar. 20, 2015.
Final Office Action dated Mar. 19, 2018, for U.S. Appl. No. 14/830,662, of Grassadonia, B., filed Aug. 19, 2015.
Final Office Action dated Apr. 10, 2018, in U.S. Appl. No. 14/838,246, of Grassadonia, B., et al., filed Aug. 27, 2015.
Non-Final Office Action dated May 31, 2018, in U.S. Appl. No. 14/838,253, of Grassadonia, B., et al., filed Aug. 27, 2015.
Final Rejection dated May 31, 2018, for U.S. Appl. No. 14/664,781, of Aaron, Y., N., filed Mar. 20, 2015.
Final Office Action dated May 31, 2018, for U.S. Appl. No. 14/830,659, of Grassadonia, B., filed Aug. 19, 2015.
Notice of Allowance dated Jul. 9, 2018, for U.S. Appl. No. 14/830,662, of Grassadonia, B., filed Aug. 19, 2015.
Advisory Action dated Jul. 17, 2018, in U.S. Appl. No. 14/838,246, of Grassadonia, B., et al., filed Aug. 27, 2015.
Non Final Office Action dated Oct. 18, 2018, for U.S. Appl. No. 14/830,659, of Grassadonia, B., filed Aug. 19, 2015.
Non Final Office Action dated Jan. 2, 2019, for U.S. Appl. No. 14/664,781, of Aaron, Y., N., filed Mar. 20, 2015.
Final Office Action dated Feb. 7, 2019, for U.S. Appl. No. 14/838,253, of Grassadonia, B., et al., filed Aug. 27, 2015.
Notice of Allowance dated Apr. 8, 2019, for U.S. Appl. No. 14/830,659, of Grassadonia, B., filed Aug. 19, 2015.
Final Office Action dated Jun. 17, 2019, for U.S. Appl. No. 14/664,781, of Aaron, Y., N., filed Mar. 20, 2015.
Non Final Office Action dated Sep. 6, 2019, for U.S. Appl. No. 14/838,253, of Grassadonia, B., filed Aug. 27, 2015.
Final Office Action dated Feb. 20, 2020, for U.S. Appl. No. 14/838,253, of Grassadonia, B., et al., filed Aug. 27, 2015.
Advisory Action dated Apr. 29, 2020, in U.S. Appl. No. 14/838,253, of Grassadonia, B., et al., filed Aug. 27, 2015.
Non Final Office Action dated Jul. 1, 2020, for U.S. Appl. No. 14/664,781, of Ng, A.Y., et al., filed Mar. 20, 2015.
Non-Final Office Action dated Aug. 25, 2020, in U.S. Appl. No. 14/838,253, of Grassadonia, B., et al., filed Aug. 27, 2015.
Non-Final Office Action dated Sep. 4, 2020, in U.S. Appl. No. 16/565,016, of Grassadonia, B., et al., filed Sep. 9, 2019.
Final Office Action dated Feb. 2, 2021, in U.S. Appl. No. 14/838,253, of Grassadonia, B., et al., filed Aug. 27, 2015.
Final Office Action dated Feb. 4, 2021, in U.S. Appl. No. 16/565,016, of Grassadonia, B., et al., filed Sep. 9, 2019.
Final Office Action dated May 27, 2021, for U.S. Appl. No. 14/664,781, of Ng, A.Y., et al., filed Mar. 20, 2015.
Non-Final Office Action dated Jun. 10, 2021, in U.S. Appl. No. 16/565,016, of Grassadonia, B., et al., filed Sep. 9, 2019.
Notice of Allowance dated Dec. 7, 2021, in U.S. Appl. No. 16/565,016, of Grassadonia, B., et al., filed Sep. 9, 2019.
Non-Final Office Action dated Mar. 2, 2022, in U.S. Appl. No. 17/512,618, of Ng, A.Y, et al., filed Oct. 27, 2021.

* cited by examiner

FIG. 9

DYNAMICALLY DETERMINING A CUSTOMIZED TRANSACTION FLOW

PRIORITY

This application is a continuation under 35 U.S.C. § 120 of U.S. patent application Ser. No. 16/565,016, filed 9 Sep. 2019, which is a continuation under 35 U.S.C. § 120 of U.S. patent application Ser. No. 14/830,659, filed 19 Aug. 2015, which is incorporated herein by reference.

BACKGROUND

Payment transactions are crucial in everyday life for both personal transactions as well as business transactions. For an individual payer, making payments to different individuals and/or businesses can be burdensome when each individual and/or business relies on a different payment process. For example, a salon may utilize a computer system implemented by Vendor X while a restaurant may utilize a computer system implemented by Vendor Y. For a given business, the ability to simplify the payment process for its customers can significantly reduce friction in the sales of its good and/or services, and increase customers' willingness to engage in transactions with the business. However, existing systems often involve extensive learning curves for both the payers and the payees, while not sufficiently catering to the differing business needs of payees.

BRIEF DESCRIPTION OF THE DRAWINGS

Embodiments of the disclosed technology will be described and explained through the use of the accompanying drawings in which:

FIG. 9 illustrates example graphical user interfaces of a mobile application for enabling various tipping flows, in accordance to some embodiments of the transaction flow technology;

DETAILED DESCRIPTION

Figure 1:
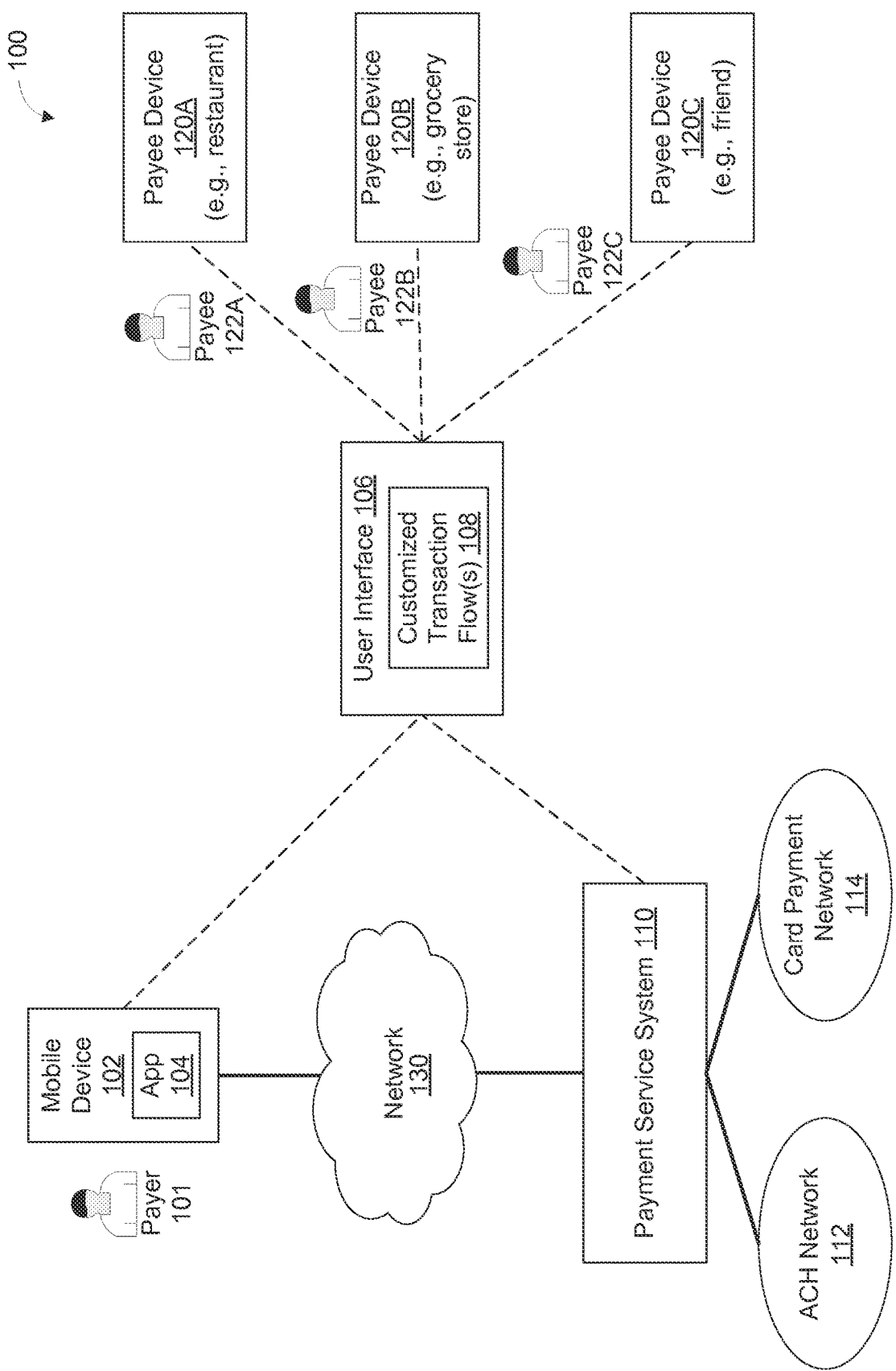
FIG. 1 illustrates an example of a network-based environment in which various embodiments of the transaction flow technology can be utilized.

Introduced here is a technology for customizing the flow of a payment transaction at a mobile device of a payer, wherein the flow is customized based on characteristics of a payee to whom the payer is making the payment (the "transaction flow technology"). Such characteristics, or "parameters," can include a payee type, a payee description, or a payee transaction history. The payees can include, for example, a restaurant, a car wash service, a non-profit organization, a personal friend of the payer, etc. A customized transaction flow for a restaurant payee can include, for example, a tipping process and a feedback process. In another example, the transaction flow for a non-profit organization payee can include a donation and registration process. In yet another example, the transaction flow for a personal friend payee can include a confirmation and personal note process.

In at least some embodiments, the transaction flow technology involves communication between a mobile payment application installed on the payer's mobile device and a remote payment service system (PSS). Upon detecting the payer's intent to engage in a payment transaction, the mobile payment application automatically populates a list of potential payees (e.g., displayed as identifiers) for selection by the payer. The potential payees can be nearby payees identified by using, e.g., BLUETOOTH®, BLUETOOTH LOW ENERGY® (BLE), WI-FI®, geofence, etc. The potential payees can also be retrieved from past transactions conducted by the payer. Upon the payer's selection of a given payee, the mobile payment application communicates the selection to the PSS, which then executes, or triggers execution, of a transaction flow customized based on parameters associated with the selected payee. The transaction flow guides the payer through one or more processes (e.g., tipping, feedback, etc.) to complete the payment transaction with the selected payee, where that guidance is based on the parameters.

Consider an example scenario in which a payer launches the mobile payment application on the payer's mobile device to initiate a payment transaction. The mobile payment application detects this application launch as an indication that the payer intends to make a payment, and responsively outputs a user interface that suggests one or more identifiers corresponding to one or more payees for the payer to select as the payee to receive a payment. In some embodiments, the mobile payment application suggests the identifiers based on, for example, an address book of the payer stored in the mobile device, a list of recent contacts of the payer stored on the mobile device, information on other nearby payees (e.g., via BLE, Bluetooth, geofence), or a combination thereof. The user interface can also prompt the payer to select a payee with whom to engage in a payment transaction.

In some embodiments, the mobile payment application causes the mobile device to transmit a message to the PSS to convey the payer's intent to engage in a payment transaction. The message can include information about the payer's mobile device (e.g., geographical location, device ID, app ID, etc.) and/or about the payer (e.g., payer identifier, login credentials, etc.). The PSS can identify one or more payees (i.e., potential payees) of the mobile payment application that are in proximity to the payer's mobile device based on identification information of those users' mobile devices. Alternatively, the PSS can identify past payees to whom the payer has made payments in past transaction(s), for example, by performing a database lookup based on an association between the payer's account with the PSS and the payer identifier, which the payer previously specified to the PSS in those past transaction(s). The PSS then sends to the payer's mobile device a message directed to the mobile payment application. The message is configured to cause the mobile payment application to output to the payer a user interface that presents the list of potential payees and prompts the payer to select a payee with whom to engage in a payment transaction.

In some embodiments, the payer can input, to the payment application, one or more alphanumerical characters indicative of a payee identifier to indicate the payee to whom payment is to be made. The mobile payment application can monitor for any character input and responsively generate and/or update the list of potential payees based on each character input submitted in real-time. The mobile payment application can update the list based on information stored at the mobile device, as discussed above, or can alternatively communicate with the PSS to update the list.

After the payer has input a selection of a payee to the mobile device, the mobile payment application causes the mobile device to transmit a message to convey that selection to the PSS. The PSS then executes or triggers a transaction flow to guide the payer through the payment transaction with the selected payee, according to parameters associated with that payee. In particular, the PSS can determine a particular transaction flow to execute by first performing a database lookup of the payee e.g., based on the identifier selected by the payer at the mobile device, and identifying parameters stored in association with that identifier of the payee. The parameters can include a payee type, a payee description, any transaction history involving the payee, a payment criterion, or any combination thereof. For example, for selection of an identifier "RedCross," the parameters can include a first parameter that is a payee type of "non-profit entity" and second parameter that is a payee description of "The Red Cross." In another example, for selection of an identifier "Tacos_on_the_go," the parameters can include a first parameter that is a payee type of "quick-service entity," a second parameter that is a payee description of "Tacos Food Truck," and a third parameter that is a payment criterion of "minimum $1 tip."

Based on the parameters of the payee's identifier, the PSS determines a particular transaction flow for the payment transaction between the payer and the payee. The PSS can select the particular transaction flow from multiple transaction flows stored in a database, where the transaction flows are different from one another based on various parameters. For the above "RedCross" example, the PSS can select the transaction flow customized for a non-profit entity, which may include a donation process and a registration process of the donator. For the above "Tacos_on_the_go" example, the PSS can select the transaction flow customized for a quick-service entity, which may include an invoice process and a tipping process. The transaction flow can also include a customized tipping amount of $1 added to the payment amount as required by the payee. In some embodiments, the PSS can generate a new transaction by incorporating different processes, as opposed to selecting a predetermined one from the stored transaction flows.

In some embodiments, the PSS can further customize a tipping flow for payees that provide goods and/or services involving tip payments. In such embodiments, the PSS, upon receiving the payer's selection of such a payee, can select the appropriate tipping flow for inclusion in the transaction flow based on particular parameter(s) associated with that payee. The parameters affecting the tipping flow can include, for example, a payee type of a restaurant and a tipping criterion of "standard." The tipping flow in this example can be a set of tipping amounts that are predefined for a standard restaurant (e.g., 15%, 20%, 25%, etc.). In another example, where the parameters include a payee type of a restaurant and a tipping criterion of "group," the tipping amount is automatically set at 18%. In yet another example, where the parameters include a payee type of a restaurant and a transaction type of a carry-out order, the set of tipping amounts can include, e.g., 10% and "No Tip."

Upon determination of the appropriate transaction flow based on the payee's parameters, the PSS sends a message directed to the mobile payment application installed on the payer's mobile device, where the message includes information about the appropriate transaction flow. The message is configured to cause the mobile payment application to output to the payer a user interface that guides the payer through one or more processes of the transaction flow. For the above "RedCross" example, the payer can be presented a user interface that first prompts the payer to enter a donation amount, and then (optionally) enter registration information to receive future news about THE RED CROSS®. Upon receiving the requested information, the mobile payment application causes the mobile device to transmit a message to the PSS to convey the received information. The PSS, in turn, transfers, or causes to be transferred, the payment (i.e., donation amount) to THE RED CROSS®. This can include, for example, transferring funds from a financial account associated with the payer to a financial account associated with THE RED CROSS®. In some embodiments, where a tipping flow is included in the transaction flow, the PSS can process the payment for the entire transaction as one complete transfer of funds, which includes both the payment amount for the transaction and the tipping amount customized based on the payee's parameters.

Among other benefits, the transaction flow technology makes payment transactions relatively seamless and easy as compared to traditional methods. On one hand, payers can make payments to anyone (e.g., a friend or a restaurant) by accessing the same interface, and the payment application automatically modifies the transaction flow to accommodate. On the other hand, payees are able to sell goods, services, or otherwise conduct transactions, with any payer who has access to the payment application, which caters to the payment processing needs of the payees. Furthermore, since payments can be transferred by mere use of an identifier (e.g., Mediterranean_restaurant, alexb, RedCross, etc.), neither the payer nor the payee has to provide (or remember) complicated details typically required for making a payment (e.g., billing information, service account number, etc.). Additionally, for transactions with a tipping flow, the technology disclosed here provides efficient payment processing that enables the payee to receive funds from the payer in one charge (i.e., customized tipping amount included in the transaction charge), in contrast to the back-and-forth traditional methods, which typically require a first request for authorization of the payment amount, followed by a second request for authorization of the tipping amount.

Various embodiments and implementations of the transaction flow technology will now be described. The following description provides specific details for a thorough understanding and an enabling description of these implementations. One skilled in the art will understand, however, that the disclosed system and methods may be practiced without many of these details. It is noted that while the various embodiments are described with reference to a payment transaction, the transaction flow technology can be used for any transaction implementation involving a first party dealing with various second parties, where such implementation necessitates a different transaction flow (i.e., involving different processes) for every second party. Additionally, while in the various embodiments emphasized herein, the payer generally uses a mobile device to engage in the payment transaction with the customized transaction flow, in other embodiments, the payer may use a processing device other than a mobile device to engage in that transaction, such as a conventional personal computer (PC). In such embodiments, the mobile payment application can be replaced by a more conventional software application in such processing device, where such software application has functionality similar to that of the mobile payment application as described herein.

Moreover, the transaction flow technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

In this description, the terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The term "module," or "engine" refers broadly to general- or special-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments. Furthermore, if the specification states a system, a component, or a feature "may", "can", "could", or "might" be included or have a characteristic, that particular component or feature is not required to be included or have the characteristic.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

FIG. 1 illustrates an example of a network-based environment 100 in which various embodiments of the transaction flow technology can be utilized. The environment 100 illustrated in FIG. 1 includes a mobile device 102 of a payer user 101 (or, "payer 101") and a computer server system 110 of a payment service (hereinafter, payment service system (PSS) 110"), which is coupled in communication with the mobile device 102 via a network 130. The mobile device 102 can be, for example, a smart phone, a tablet computer, a notebook computer, or any other form of mobile processing device. A mobile payment application 104 (hereinafter, "App 104") executes on the mobile device 102 of the payer 101. In some embodiments, the mobile device 102 can be a personal computer or any other form of non-mobile processing device that is capable of communicating with the PSS 110 via networks (e.g., the network 130). In such embodiments, the App 104 can be replaced by a more conventional software application with functionality similar to that of the App 104.

In some embodiments, the PSS 110 can communicate with a computer system 112 of an Automated Clearing House (ACH) network (hereinafter, "ACH Network 112"). The ACH Network 112 can communicate with a payer bank account and a payee bank account. The payer bank account and the payee bank account can transfer money, e.g., using the ACH network, in response to a request to transfer money from the PSS 110. There can also be computer systems of other entities, e.g., a card acquirer, between the PSS 110 and card issuers and between the PSS 110 and bank accounts.

In some embodiments, the PSS 110 can communicate with a computer system 114 of a card payment network (hereinafter, "Card Payment Network 114"), such as a debit card payment network (e.g., STAR or PULSE) or a credit card payment network (e.g., VISA® or MASTERCARD®). The PSS 110 can communicate with the Card Payment Network 114 over the same network 130 used to communicate with the mobile device 130, or over a different network. The Card Payment Network 114 can communicate, in turn, with a computer system of a payer card issuer (not shown for simplicity), e.g., a bank, and a computer system of a payee card issuer (not shown for simplicity). The payer card issuer and the payee card issuer can transfer money, e.g., over a debit payment network ("debit rails"), in response to a request to transfer money from the PSS 110.

In some embodiments, the payer 101 has a pre-established a financial account with the PSS 110, such that any transaction approval request relating to that financial account will get processed by the PSS directly (e.g., as opposed to the PSS 110 communicating with the Card Payment Network 114 or the ACH Network 112). In such embodiments, the payer's financial account is stored by the PSS 110 in association with information about the payer, such as an identifier of the payer (hereinafter, "payer identifier") (e.g., email address, phone number, etc.). The PSS 110 can use the financial account to pay for a transaction made using a service and/or an application provided by the PSS 110 (e.g., the application 104). In some embodiments, such a financial account may be associated with multiple accounts (e.g., bank accounts, pre-paid accounts, user accounts, etc.) and/or other payment mechanisms of different types (e.g., credit card accounts, debit card accounts, etc.) of the payer 101. In some embodiments, the payer 101 can select (or the PSS 110 can automatically select) any one of the payment mechanisms to pay for a given transaction.

Each of the aforementioned computer systems in the environment 100 can include one or more distinct physical computers and/or other processing devices which, in the case of multiple devices, can be connected to each other through one or more wired and/or wireless networks. All of the aforementioned devices are coupled to each other through the network 130, which can be or include the Internet and one or more wireless networks (e.g., a WIFI® network and/or a cellular telecommunications network).

The mobile device 102 typically includes a display that can be used to display a user interface 106, and may include suitable input devices (not shown for simplicity) such as a keyboard, a mouse, or a touchpad. In some embodiments, the display may be a touch-sensitive screen that includes input functionalities. The App 104 can output the user interface 106 based on one or more instructions received from the PSS 110. The user interface 106 can present to the payer 101 a transaction flow 108 that is customized based on parameters associated with a user payee (hereinafter, "payee") to whom the payer 101 wishes to make a payment and/or otherwise engage in a transaction. The App 104 can cause the user interface 106 to present a list of potential payees 122A-C to the payer 101. The one or more potential payees 122A-C can include, for example, a restaurant, a grocery store, or a personal friend of the payer 101. Other example payees can include a fundraising organization (e.g., political cause), a non-profit organization, a professional service, etc.

In some embodiments, the list of potential payees 122A-C can be generated based on information about other nearby payees, for example, based on wireless signals from nearby devices such as the payee devices 120A-C. The wireless signals can be based on a short-range wireless communication feature (e.g., BLUETOOTH® or BLUETOOTH LOW ENERGY® (BLE)), a wireless networking feature of the payee device 120, and/or any combination thereof. In some embodiments, the list of potential payees 122A-C can be generated based on an address book stored in the mobile device 102.

In some embodiments, the list of potential payees 122A-C can be generated based on recent contacts stored in the mobile device 102. The recent contacts can be analyzed and extracted from recent interactions and/or transactions conducted by the payer 101 through the App 104. For example, the contacts are extracted from transaction history stored by the App 104 at the mobile device 102, where the transaction history records past transactions conducted using the App 104. Alternatively, the transaction history can be requested from the PSS 110. In some embodiments, the recent contacts are retrieved from recent interactions and/or transactions that are not conducted through the App 104. For example, the recent interaction is a phone conversation or an instant message. In some embodiments, the App 104 generates the list of potential payees by communicating with the PSS 110, which determines potential payees and sends back the list via a message that causes the App 104 to output the list to the payer 101 at the user interface 106.

Figure 2:
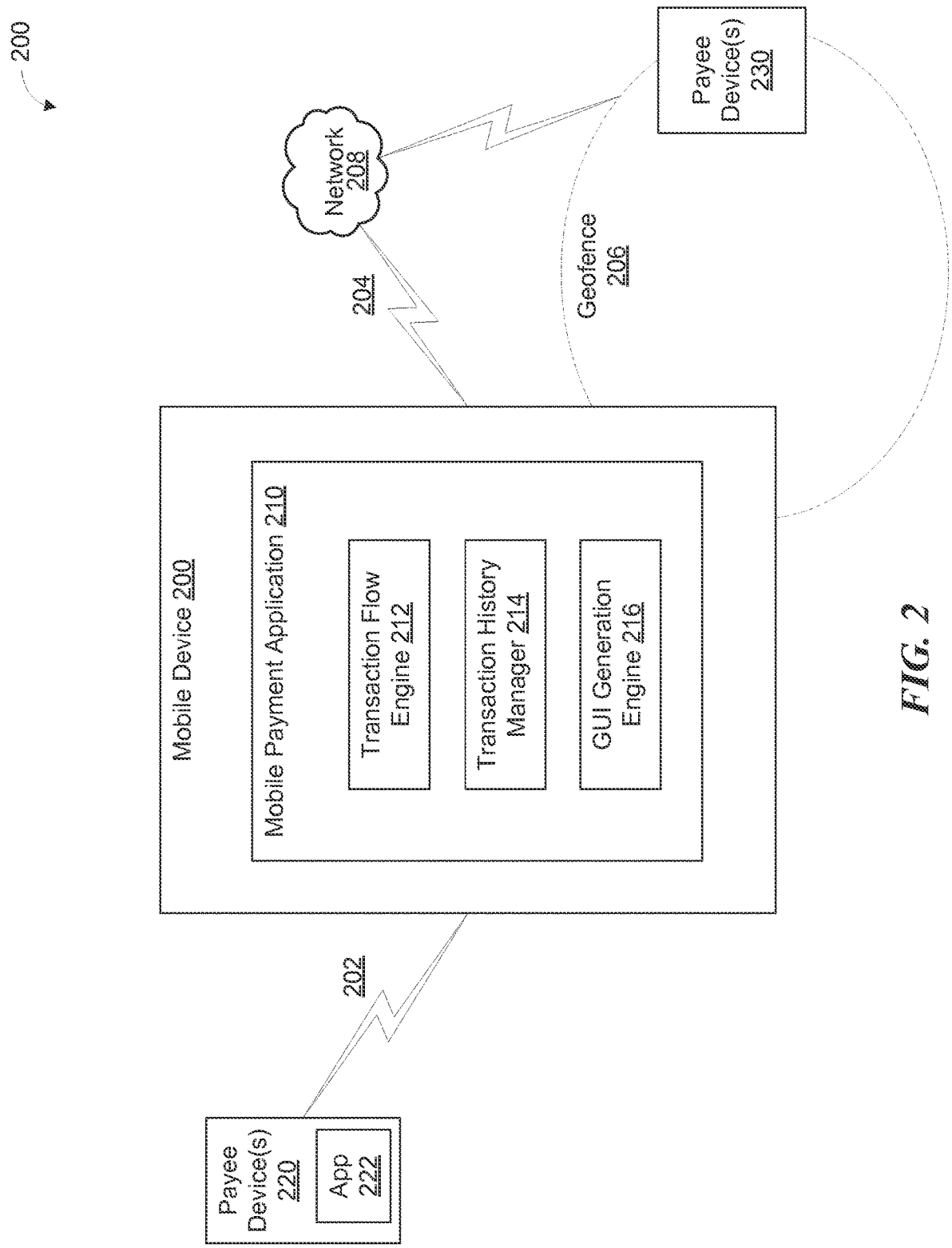
FIG. 2 illustrates various components of a mobile device that can be used in accordance with various embodiments of the transaction flow technology.

FIG. 2 illustrates various components of a mobile application 210 executing on a mobile device 200 in accordance with various embodiments of the transaction flow technology. In some embodiments, the mobile device 200 can be the mobile device 102 of FIG. 1. In some embodiments, the mobile application 210 is the App 104 that is associated with the PSS 110 of FIG. 1. In the embodiments of FIG. 2, the mobile application 210 can include a transaction flow engine 212, a transaction history manager 214, and a graphical user interface (GUI) generation engine 216. Other embodiments of the transaction flow technology may include some, all, or none of these components along with other components. Still yet, some embodiments may incorporate two or more of these components into a single component and/or associate a portion of the functionality of one or more of these components with a different component. For example, in some embodiments, the transaction flow engine 212 and the transaction history manager 214 can be combined into a single component.

The transaction flow engine 212 can detect an intent of a user (i.e., payer) to make a payment to another user (i.e., payee) at the mobile application 210, and generate a transaction flow that is customized based on parameters of the payee. In some embodiments, the transaction flow engine 212 can detect the intent upon determining that the mobile application 210 has been launched at the mobile device 200 (e.g., the payer opens the mobile application 210). In some embodiments, the transaction flow engine 212 can detect the intent based on a message directed to the mobile application 210 and received from a nearby processing device, such as a payee's device. The message can be configured to communicate with the transaction flow engine 212 to alert the mobile application 210 of the payee's presence in proximity of the mobile device 200. Based on such alert, the transaction flow engine 212 can cause the GUI generation engine 214 to output a user interface that prompts the payer whether he/she wishes to engage in a payment transaction with that payee.

Figure 5:
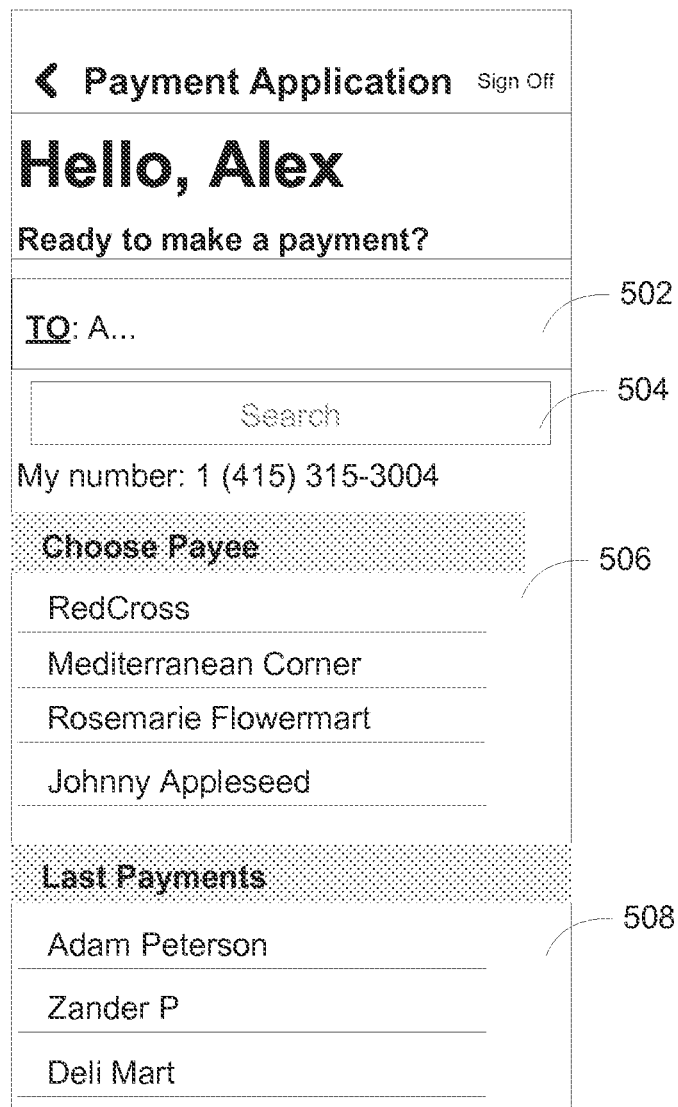
FIG. 5 illustrates an example graphical user interface of a mobile application for enabling a payer to engage in a transaction with a payee, in accordance to some embodiments of the transaction flow technology.

In some embodiments, the transaction flow engine 212 can detect the intent upon receiving, at the mobile application 210, an input associated with the payee's name, or "payee identifier." The input can be, for example, an alphabetical or numerical character (e.g., "A") that is entered by the payer, for example, in a TO field of a user interface of the mobile application 210. An example of such user interface is illustrated in FIG. 5. Based on this input, the transaction flow engine 212 can determine that the payer wishes to engage in the payment transaction with a payee having an identifier that starts with the alphabetical (or numerical) input (e.g., "Adam"). The transaction flow engine 212 can generate a list of one or more potential payees to whom the payer may wish to make the payment. In some embodiments, the list may be updated with new potential payees based on each new alphanumerical character input received at the mobile application 212.

In some embodiments, the transaction flow engine 212 can generate the list of potential payees based on an address book of the payer stored in the mobile device 200. In some embodiments, the transaction flow engine 212 can generate the list of potential payees based on the payer's recently used contacts stored on the mobile device 200. The recently used contacts can be based on recent interactions and/or transactions that are not conducted through the mobile application 212 (e.g., instant message). In some embodiments, the recently used contacts can be based on past payment transactions. These past transactions can be stored at the mobile device 200 and managed by the transaction history manager 214. The transaction history manager 214 can track and store a history of payment transactions engaged in by the payer of the mobile device 200 with one or more payees, using the mobile application 210. The history of payment transactions can include payee identifiers that can be used to identify contacts with whom the payer has had recent interactions; these contacts can then be generated as part of the list of potential payees suggested by the mobile application 210 to the payer for future payment transactions.

In some embodiments, the transaction flow engine 212 can communicate with a networking component of the mobile device 200 to identify nearby payees. For example, the mobile application 210 may invoke, in some embodiments, a short-range wireless communication feature of the mobile device 200 that enables connection 202 with other nearby device(s), e.g., payee device(s) 220, such as BLUETOOTH®, BLUETOOTH LOW ENERGY® (BLE), infrared communication, or the like. These payee device(s) 220 can be executing another mobile application 222 ("App 222") that is configured to communicate with the mobile application 210. In some embodiments, the App 222 can be associated with the PSS (e.g., PSS 110), and can be, for example, a payee-customized version of the mobile application 210, to enable a payee to interact with payment receiving functionalities managed by the PSS. Such a payee can be, for example, a user who is registered with the PSS to receive payments through the App 222.

In another example, the mobile application 210 may invoke, in some embodiments, a wireless networking feature of the mobile device 200 that enables high-speed connection 204 to a network 208 (e.g., the Internet), such as WI-FI® or the like, to identify nearby devices, e.g., payee device(s) 230. The mobile device 200 can communicate with the payee device(s) 230 through use of a geofence 206, which is defined by a plurality of wireless access points (APs) connected to the network 208. For example, the mobile device 200 can detect the payee device 230 upon physical entrance into the geofence 206 based on the connection 204. The payee device(s) 230 can execute a mobile application that is configured to communicate with the mobile application 210. In some embodiments, such mobile application can be associated with the PSS (e.g., PSS 110), and can be, for example, a payee-customized version of the mobile application 210, to enable a payee to interact with payment receiving functionalities managed by the PSS. Such a payee can be, for example, a user who is registered with the PSS to receive payments through that mobile application.

In some embodiments, the mobile application 210 transmits, or causes to be transmitted, a message to the PSS requesting for the list of potential payees. The mobile application 210 can combine the payees received back from the PSS with its own list of payees. In some embodiments, the mobile application 210 proceeds without requesting the potential payees from the PSS.

With the list of potential payees, the payer is given an option to select one payee to continue with the payment transaction. In some embodiments, the payer may finish inputting characters for a desired payee, where such payee may not appear in the list of potential payees. In such embodiments, the transaction flow engine 212 can cause another user interface to be generated to prompt the payer to invite the payee to register with the PSS.

Assuming the payer selects one payee from the generated list of potential payees (e.g., as illustrated in FIG. 5), the transaction flow engine 212 can determine a transaction flow based on parameters of that selected payee to guide the payer through the payment transaction with that payee. FIGS. 6-9 illustrate various transaction flows that may be determined and utilized for guiding the payer. As used here, a transaction flow refers to a set of operations executed by the transaction flow engine 212 to guide the payer through different processes that make up the flow. The one or more operations included in a given transaction flow depend on the parameters associated with the selected payee. The parameters can include, for example, a type of the payee, a description of the payee, a payment criterion of the payee, a tipping criterion of the payee, and/or any other information relating to the payee's payment preferences.

In some embodiments, the parameters are stored at the PSS (e.g., PSS 110) and retrieved by the mobile application 210 for generation of the transaction flow. In such embodiments, upon receiving the payer's selection of a payee, the transaction flow engine 212 causes the mobile device 200 to transmit a message to the PSS to request for an appropriate transaction flow based on the selection. For example, the message can include the payee identifier indicative of the selected payee. The PSS then performs a database lookup for parameters associated with that identifier, identifies the appropriate transaction flow, and transmits a return message to the mobile device 200. The message can be configured to cause the mobile device 200 to execute a set of operations included in the transaction flow at the mobile payment application 210 for guiding the payer to completion of the payment transaction. For example, responsive to the message, the transaction flow engine 212 communicates with the GUI generation engine 216 to output one or more user interfaces representative of one or more processes involved in the transaction flow, where each user interface involves execution of a particular operation corresponding to the processes.

In some embodiments, the parameters of various payees are stored at the mobile device 200, and accessible by the transaction flow engine 212 to generate the appropriate transaction flow for whichever payee selected by the payer. The parameters stored at the mobile device 200 can be for a selected group of payees. For example, only parameters of recent contacts/payees are stored. In another example, parameters of those payees that are in the address book of the payer stored at the mobile device 200 are stored at the mobile device 200. In yet another example, parameters of those payees that are specified by the payer as "Favorites" are stored at the mobile device 200. Upon access of the parameters at the mobile device 200, the transaction flow engine 212 can determine the appropriate transaction flow locally at the mobile device 200 (i.e., without having to retrieve the data from the PSS). In some embodiments, the transaction flows can be preconfigured and stored at the mobile device 200. In such embodiments, the transaction flow engine 212 can perform a search (or lookup) to select one of the transaction flows for the selected payee based on the payee's parameters. In some embodiments, the transaction flow engine 212 creates the transaction flow based on the parameters identified for the selected payee. In such embodiments, the different processes for generating the transaction flow can be stored at the mobile device 200, and the transaction flow engine 212 can combine one or more of those processes to create the transaction flow based on an analysis of the selected payee's parameters. Example user interfaces of the various transaction flows are illustrated in FIGS. 6-9.

The GUI generation engine 216 can generate one or more user interfaces (i.e., GUI screens) that allow for interaction with a user of the mobile device 200. In some embodiments, the GUI generation engine 216 generates a user interface allowing the payer to start engaging in a payment transaction with the payee by, for example, input payee name (e.g., identifier of a payee), selecting application functionality, and/or otherwise interact with one or more application functionalities. FIGS. 5-9 illustrate various examples of graphical user interfaces that can be generated by the GUI generation engine 216.

Figure 3:
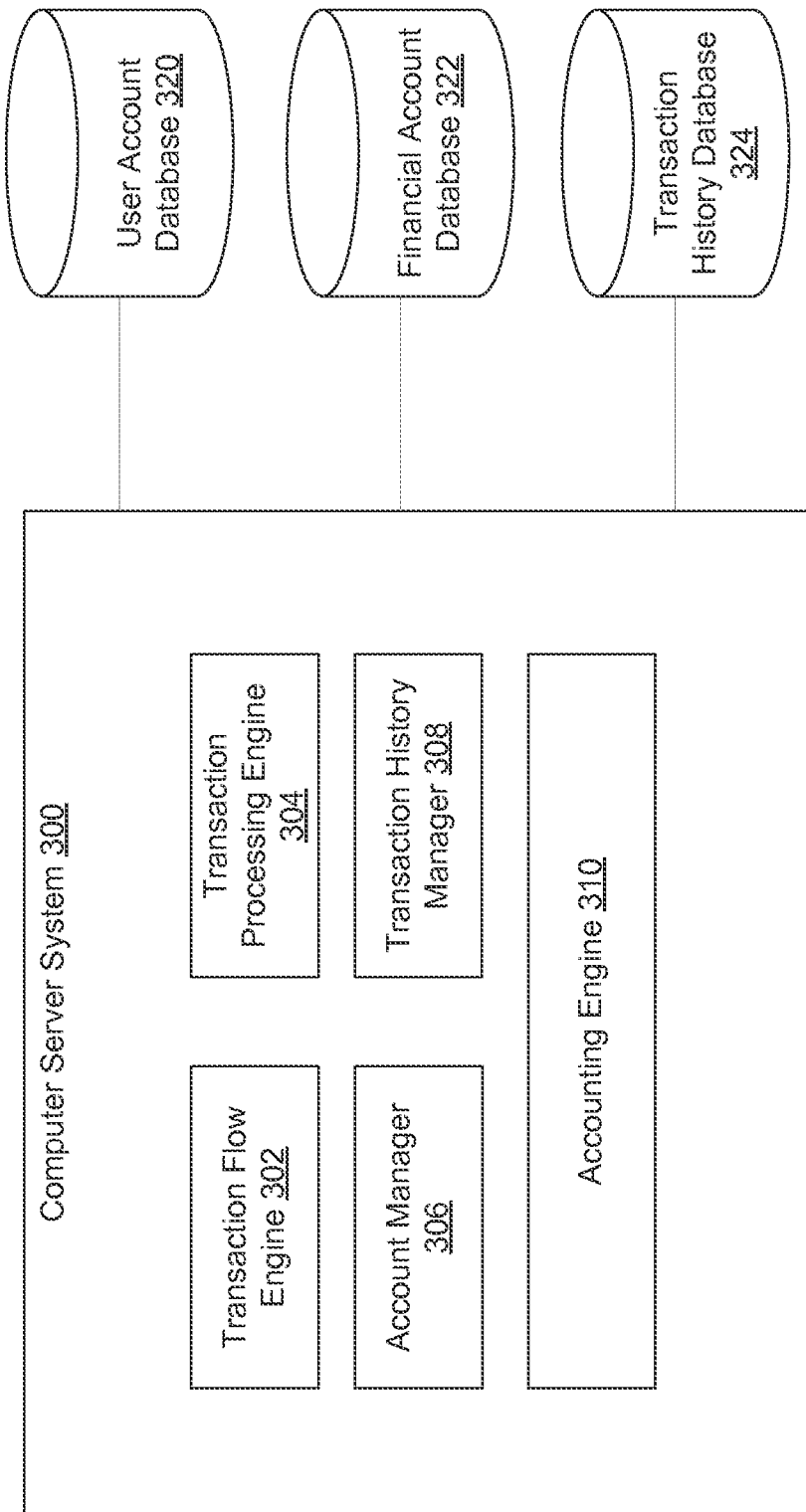
FIG. 3 illustrates various components of a computer server system that can be used in accordance with various embodiments of the transaction flow technology.

FIG. 3 illustrates various components of a computer server system 300 that can be used in accordance with various embodiments of the transaction flow technology. In some embodiments, the computer server system 300 can be the PSS 110 of FIG. 1. According to the embodiments shown in FIG. 3, the computer server system 300 can include a transaction flow engine 302, a transaction processing engine 304, an account manager 306, a transaction history manager 308, and an accounting engine 310. In some embodiments, the computer server system 300 can also include a user account database 320, a financial account database 322, and a transaction history database 324. Other embodiments of the disclosed technology can include some, all, or none of these components along with other components. Still yet, some embodiments can incorporate two or more of these components into a single component and/or associate a portion of the functionality of one or more of these components with a different component. For example, in some embodiments, the transaction flow engine 202 and the transaction processing engine 304 (and/or some portions of the functionality of the transaction processing engine 304) can be combined into a single component for processing and executing operations associated with payment transactions.

The transaction flow engine 302 can detect an indication of a payer's intent to engage in a payment transaction, and in response, can determine an appropriate transaction flow for presentation to the payer. In some embodiments, the indication of the payer's intent can be detected by the transaction flow engine 302 receiving a message from a mobile application installed on the payer's mobile device. The mobile application can be, for example, the App 104 of FIG. 1 or the mobile application 210 of FIG. 2. The message can include information relating to the payer's intent to engage in the payment transaction. For example, the message can include an indication that the payer has launched the mobile application at the payer's mobile device. In another example, the message can include a payee identifier of an entity or individual to whom the payer wishes to send a payment. The payee identifier can be a complete identifier or a portion of the identifier (e.g., one or more alphanumerical characters input by the payer into the mobile application). In yet another example, the message can include an identifier of the payer ("payer identifier") in addition to the payee identifier. The payer identifier can be part of login credentials submitted by the payer for accessing the mobile application and/or functionalities provided by the mobile application (e.g., payment transfer functionalities).

Responsive to the indication of the payer's intent, the transaction flow engine 302 can generate a list of potential payees for display to the payer at the mobile device. In some embodiments, the transaction flow engine 302 generates the list by communicating with the transaction history manager 308 to identify one or more potential payees with whom the payer has conducted a payment transaction in the past. In some embodiments, the transaction flow engine 302 generates the list by communicating with the account manager 306 to first identify the payer. The payer can be identified based on the payer identifier included in the message from the mobile application, and then identify one or more payees associated with the payer. These payees can be specified by the payer, for example, as "Favorites" and stored in association with the payer identifier in an account of the payer with the computer server system 300.

Upon identifying the potential payees, the transaction flow engine 302 transmits, or causes to be transmitted, a message directed to the mobile application installed at the payer's mobile device. The message can be configured to cause the mobile application to output a user interface at the mobile device to display the list of payees. The payer may select a payee from that list to continue with the payment transaction with that payee. The mobile application installed at the payer's mobile device can transmit, or causes to be transmitted, a message back to the computer server system 300 to convey information about the payer's selection (e.g., payee identifier of the selected payee). The message can cause the computer server system 300, more specifically the transaction flow engine 302, to determine a customized transaction flow for carrying out the payment transaction with the selected payee.

In determining the transaction flow, the transaction flow engine 302 can perform a database lookup for parameters associated with the payee identifier (e.g., user account database 320). The transaction flow engine 302 can identify the appropriate transaction flow based on those parameters. In particular, the transaction flow engine 302 can select a particular transaction flow from multiple transaction flows that are preconfigured and stored at the computer server system 300 (e.g., transaction history database 324 or another database not shown). In some embodiments, the transaction flow engine 302 can create a new transaction flow based on the parameters identified for the selected payee. In such embodiments, the different processes that can be incorporated for generating the new transaction flow can be stored at the computer server system 300. The transaction flow engine 212 can combine one or more of those processes to create the transaction flow based on an analysis of the selected payee's parameters.

Upon determination/generation of the transaction flow, the transaction flow engine 302 can transmit, or cause to be transmitted, a message to the payer's mobile device. The message can be configured to cause the mobile device to execute a set of operations included in the transaction flow at the mobile payment application 210. For example, responsive to the message, the mobile device outputs one or more user interfaces representative of one or more processes involved in the transaction flow, where each user interface involves execution of a particular operation corresponding to the processes.

The transaction processing engine 304 can process the payment for the transaction between the payer and the payee at the completion of a particular transaction flow. Such processing can include, for example, communicating with one or more financial entities (e.g., the ACH Network 112 or the Card Payment Network 114 of FIG. 1), to transfer, or cause to be transferred, funds indicative of the total payment amount from an account of the payer to an account of the payee. In some embodiments, the accounts of the payer and the payee, respectively, are financial accounts maintained by a payment service employing the computer server system 300. In such embodiments, the funds are transmitted between accounts maintained, for example, by the accounting engine 310.

The account manager 306, in some embodiments, can register one or more users with the payment service employing the computer server system 300. The transaction history manager 308, in some embodiments, can track and store a history of payment transactions handled by instances of the mobile application installed at various payers' mobile devices. The accounting engine 310, in some embodiments, can be used to track financial transactions associated with the payment transactions. For example, the accounting engine 310 can ensure that payment(s) from a payer to a payee are properly deducted and credited.

The databases 320, 322, 324 can be accessed by the computer server system 300 for retrieving and/or storing information associated with operations executed by the transaction flow engine 302 and/or the transaction processing engine 304. The user account database 320 can store users' profiles and personal preferences. For example, the user account database 320 can include database tables that store various fields of information such as a customer identifier, name, email address, phone number, device identifier, mobile application identifier, billing address, shipping address, and/or the like. The financial account database 322 can include database tables that store various fields of information such as a customer identifier, payment card/account number (e.g., primary account number or PAN), expiration date, card/account type, and/or the like. The transaction history database 324 can include database tables that store various fields of information such as a transaction identifier, date, customer identifier, payer name, merchant name, payee name, amount, product/service item names/codes, and/or the like. Various other databases may also be accessed by the computer server system 300 other than those discussed here. The databases 320, 322, 324 can each, or collectively, be one or more hard drives (which may be further coupled together using RAID-0, 1, 5, 10, etc.), a centralized or distributed data cluster, a cloud-storage service provider, or other suitable storage systems suitable for storing digital data.

Figure 4:
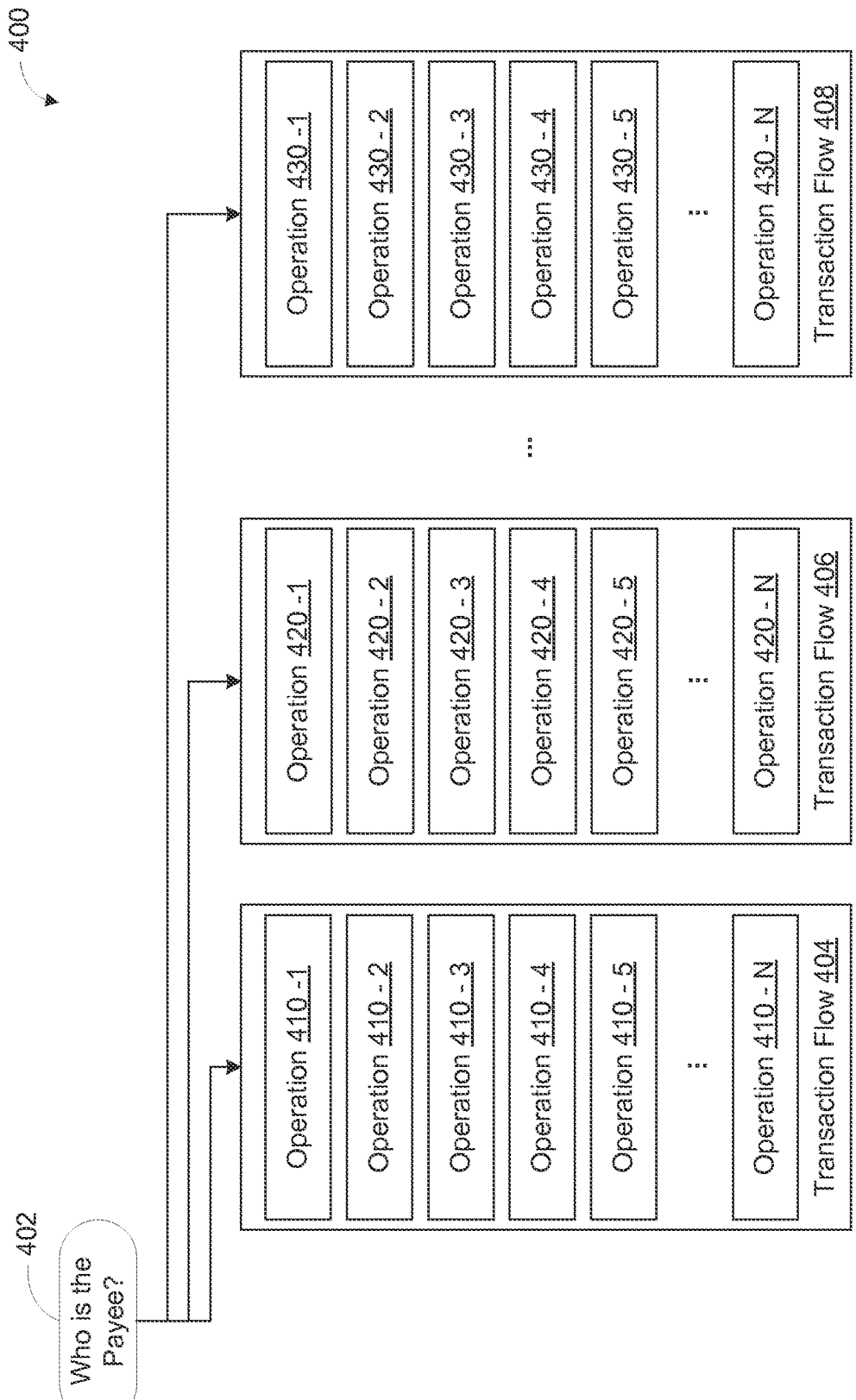
FIG. 4 illustrates an example data flow for generating a customized transaction flow in accordance to various embodiments of the transaction flow technology.

FIG. 4 illustrates an example data flow 400 for generating a customized transaction flow in accordance to various embodiments of the transaction flow technology. The example data flow 400 can be part of a process implemented by a computer server system (e.g., system 300 of FIG. 3) employed by a payment service. For example, the PSS 110 of FIG. 1 can execute a process involving the example data flow 400.

In the illustrated embodiments of FIG. 4, the example data flow 400 includes a processing block 402 in which the system determines who is a payee for which the transaction flow is to be customized. In particular, the system identifies the identity of the payee and the parameters of that identified payee. The payee can be, for example, an individual or a business entity. The parameters of the payee can include a payee type, such as a person (e.g., friend), a restaurant, a café, a professional service, a quick service, a non-profit organization, a political cause, a human-welfare cause, etc. The "professional service" as used here can include, for example, a massage service, a hair salon service, home cleaning, etc. The "quick service" as used here can include,
for example, a food truck service, a car wash, pizza delivery, coatroom service, valet service, etc. The parameters can further include other information about the payee, such as name, size, transaction history, description, etc.

Based on the parameters, the system can select one of many transaction flows 1-N where N is an integer greater than 1 (e.g., transaction flows 404, 406, and 408), to guide the payer through a transaction conducted with the payee. A given transaction flow can include a set of one or more operations that correspond to different processes involved in the transaction flow. The system can execute the set of operations to enable a customized guidance for the payer to complete the transaction with the payee.

Figure 6:
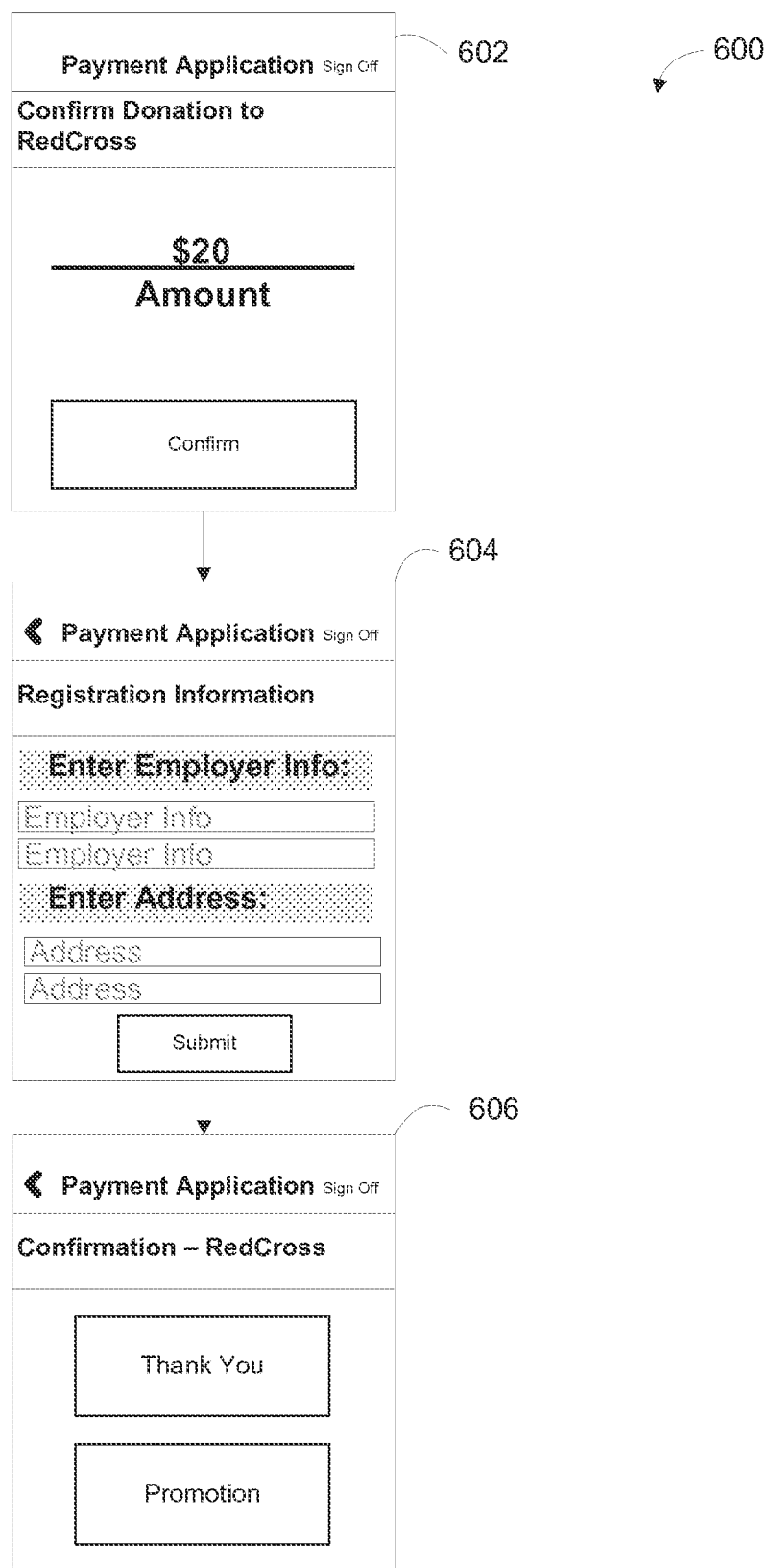
FIG. 6 illustrates an example set of graphical user interfaces of a mobile application for enabling a first transaction flow, in accordance to some embodiments of the transaction flow technology.
Figure 7:
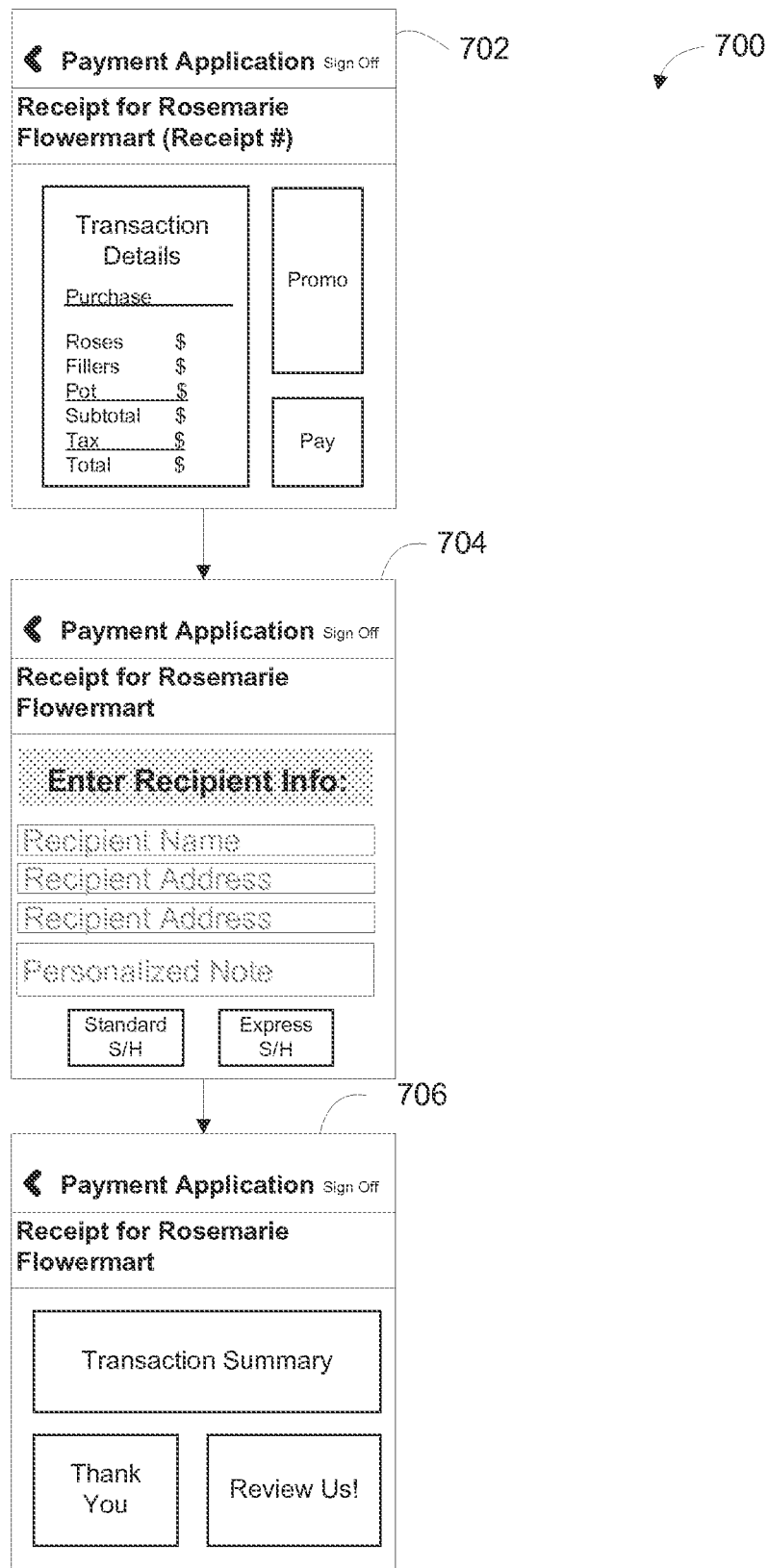
FIG. 7 illustrates an example set of graphical user interfaces of a mobile application for enabling a second transaction flow, in accordance to some embodiments of the transaction flow technology.
Figure 8:
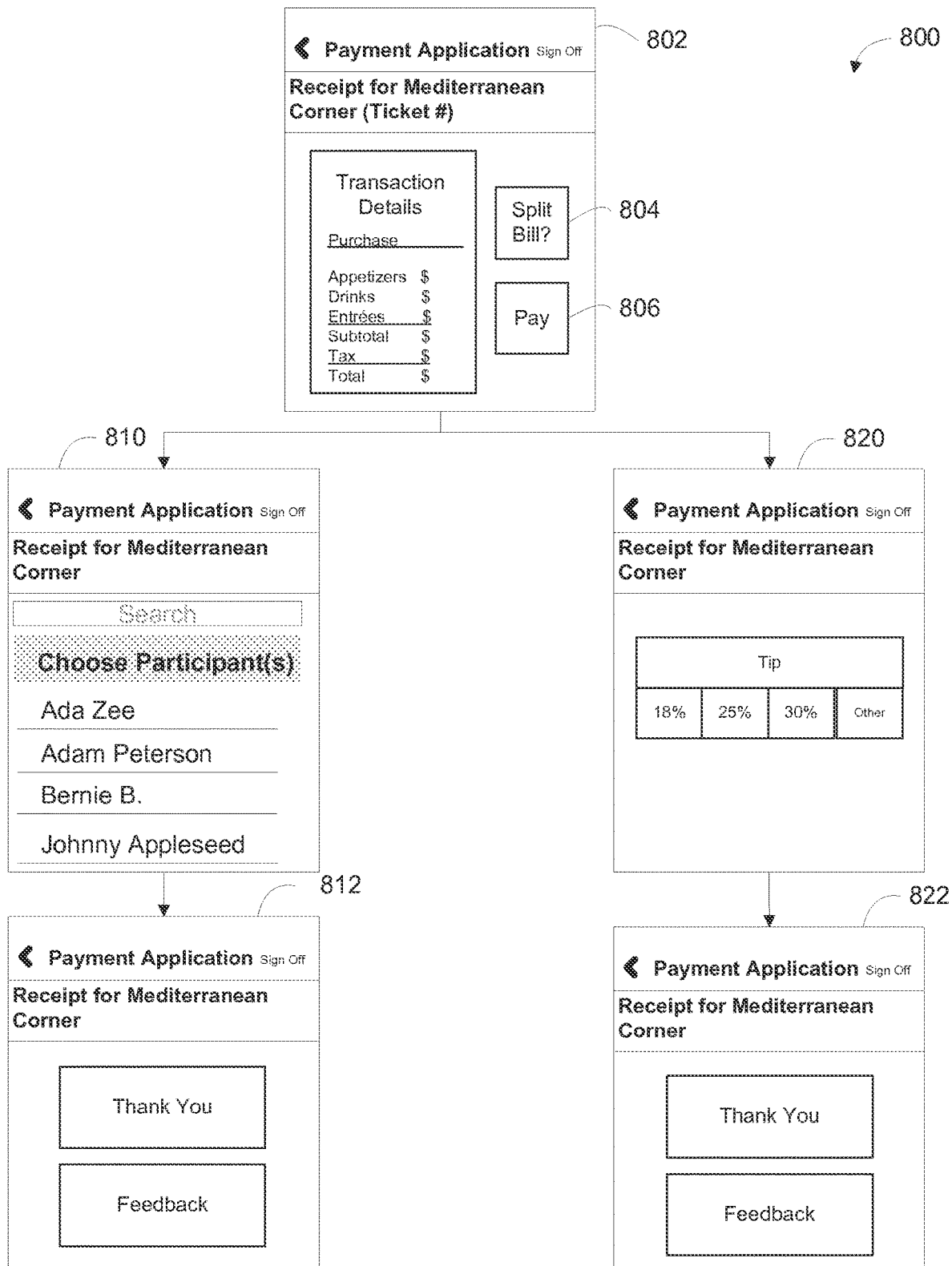
FIG. 8 illustrates an example set of graphical user interfaces of a mobile application for enabling a third transaction flow, in accordance to some embodiments of the transaction flow technology.

For example, the transaction flow 404 can be a preconfigured transaction flow that is customized for a political cause payee, and can include a verification and registration flows (i.e., collectively sub-flows of the flow 404) prompting the payer to verify the donation amount and input employment information. The system can carry out the transaction flow 404 by executing the set of operations 410 1-N corresponding to the verification and registration flows, or processes. The example transaction flow 404 is illustrated in FIG. 6. In another example, the transaction flow 406 can be a preconfigured transaction flow that is customized for a flower business payee, and can include an invoice flow that generates an invoice for a flower order and a recipient information flow prompting the payer to enter recipient information (i.e., collectively sub-flows of the flow 406). Such example transaction flow is illustrated in FIG. 7. The system can carry out the transaction flow 406 by executing the set of operations 420 1-N. In yet another example, the transaction flow 406 can be a preconfigured transaction flow that is customized for a political cause payee, and can be a preconfigured transaction flow that is customized for a fine-dining restaurant payee. In such example, the transaction flow 406 can include an invoice flow that generates an invoice for the payer (e.g., including a payment amount and receipt with transaction details), a bill splitting flow that enables the payer to apportion the restaurant bill among other payers, and a tipping flow that generates tipping amounts that are predefined based on parameters of the fine-dining restaurant (i.e., collectively sub-flows of the flow 406). Such example transaction flow is illustrated in FIG. 8. The system can carry out the transaction flow 406 by executing the set of operations 420 1-N.

In some embodiments, the system generates a new transaction flow by combining different sub-flows, or processes, and incorporates operations associated with those sub-flows in the new transaction flow. For example, the new transaction flow can be generated for the payee by selecting certain sub-flows stored in the system based on the payee's parameters. These sub-flows can be derived, in some embodiments, from existing transaction flows (e.g., transaction flows 404, 406, and 408).

In some embodiments, where the payee is an entity that conducts business involving tip, the system can customize the transaction flow for the payee by selecting and/or generating an appropriate tipping flow for inclusion in that transaction flow. In such embodiments, the tipping flow can include a particular tipping flow that allows the payee (i.e., a merchant) to include a separate payment flow in the transaction flow to prompt the payer for approval of the tipping amount. For example, the transaction flow can include a first user interface prompting the payer to approve payment for the amount of the transaction (e.g., restaurant bill), and a second user interface, which presents a tipping flow, prompting the payer to approve (and/or specify) a tipping amount; that is, the transaction flow involves a two-step payment authorization process. In another example, the transaction flow can include a user interface prompting the user to approve the payment amount in addition to approving/specifying the tipping amount; that is, the transaction flow involves a one-step payment authorization process that integrates the tipping flow with the payment authorization of the original payment amount. Examples of the various tipping flows are illustrated in FIG. 9.

FIG. 5 illustrates an example graphical user interface 500 of a mobile application for enabling a payer to engage in a transaction with a payee, in accordance to some embodiments of the transaction flow technology. The mobile application can be the App 104 that is installed on the mobile device 102 of FIG. 1. The user interface 500 can be a first screen that the mobile application causes the mobile device to output initially to the payer upon the payer launching the mobile application. Such launch of the mobile application can enable the mobile device to detect the payer's intent to engage in a payment transaction. In some embodiments, the payer can begin interacting with the functionalities of the mobile application by inputting one or more alphanumerical characters in a TO field 502 of the user interface 500, for example, to start searching for a desired payee (e.g., by interacting with a "Search" action button 504). Such character input can be detected as the intent to engage in a payment transaction.

Based on detection of the payer's intent, a list of potential payees is displayed to the payer. The list of potential payees can include nearby payees 506, e.g., as detected based on communication with the respective payee devices (e.g., based on BLE, Bluetooth, geofence, etc.). The list of potential payees can also include past payees 508 that the payer has engaged in payment transactions. Upon selection of one of the payees, the mobile application can cause the payer's mobile device to output one or more user interfaces, where the user interfaces correspond to a particular transaction flow customized based on the selected payee's parameters. The various user interfaces of the particular transaction flow are illustrated in FIGS. 6-9.

FIG. 6 illustrates an example set of graphical user interfaces 600 of a mobile application for enabling a first transaction flow, in accordance to some embodiments of the transaction flow technology. The set of user interfaces 600 can be generated for a transaction flow that is customized for a donation to a non-profit organization. In the embodiments of FIG. 6, the set of user interfaces 600 includes a first user interface 602, a second user interface 604, and a third user interface 606. The first user interface 602 corresponds to an invoice screen that prompts the payer to input and confirm a donation amount. Upon confirmation, the payer is guided to the second user interface 604, which prompts the payer to enter registration information about the payer. The third user interface 606 guides the payer to the completion of the transaction with the non-profit organization, where approval of the payment is processed (e.g., by the PSS 110 of FIG. 1).

FIG. 7 illustrates an example set of graphical user interfaces of a payment application for enabling a second transaction flow, in accordance to some embodiments of the transaction flow technology. The set of user interfaces 700 can be generated for a transaction flow that is customized for a flower shop business. In the embodiments of FIG. 7, the set of user interfaces 700 includes a first user interface 702, a second user interface 704, and a third user interface 706. The first user interface 702 corresponds to an invoice screen that provides a summary of transaction details, displays a promotion relevant to the payer and/or the flower shop merchant, and prompts the payer to continue with selecting the "Pay" action button. Assuming the payer selects "Pay," the payer is guided to the second user interface 704, which prompts the payer to enter recipient information about a recipient to receive service/goods rendered by the flower shop merchant. The third user interface 706 guides the payer to the completion of the transaction with the flower shop merchant, where approval of the payment is processed (e.g., by the PSS 110 of FIG. 1).

FIG. 8 illustrates an example set of graphical user interfaces 800 of a mobile application for enabling a third transaction flow, in accordance to some embodiments of the transaction flow technology. The set of user interfaces 800 can be generated for a transaction flow that is customized for a restaurant merchant. In the embodiments of FIG. 8, the set of user interfaces 800 includes two subsets of user interfaces that correspond two different scenarios in which the transaction flow can guide the payer. The first subset of user interfaces include a first user interface 802, which operates as the initial welcoming screen for guiding the payer, a second user interface 810, and a third user interface 812. The second subset of user interfaces include the first user interface 802 again, a fourth user interface 820, and a fifth user interface 822.

The first user interface 802 corresponds to an invoice screen that provides a summary of transaction details and prompts the payer to select one of two options associated with the payment transaction. In particular, the user interface 802 displays a bill splitting option 804 and a pay option 806.

In a first scenario, assuming the payer selects the bill splitting option 804, the payer is guided to the second user interface 810, which prompts the payer to select one or more other payers with whom to split the bill from the restaurant merchant. In some embodiments, the payers can be identified for the second user interface 810 based on address book information, recent contacts information, or nearby payers using instances of the mobile application executing on the payer's mobile device. The processes involved in the second user interface 810 (i.e., the bill splitting flow) may result in additional user interfaces being output by the mobile device, but they are not shown for sake of simplicity. For example, a user interface prompting the payer to apportion the payment amount may be generated. Upon completion of the bill splitting flow, the payer is guided to the third user interface 812. The third user interface 812 guides the payer to the completion of the transaction with the restaurant merchant, where approval of the payment is processed in accordance with the apportionment specified by the payer in the bill splitting flow (e.g., by the PSS 110 of FIG. 1).

In a second scenario, assuming the payer selects the pay option 806, the payer is guided to the fourth user interface 820, which is a tipping flow included in the transaction flow based on the parameters of the restaurant merchant. The fourth user interface 820 can prompt the payer to select one of multiple tipping amounts predefined for the merchant restaurant based on the entity's parameters. Upon selection of a particular tipping amount, the payer is guided through to the fifth user interface 822. The fifth user interface 822 guides the payer to the completion of the transaction with the restaurant merchant, where approval of the payment and the tipping amount is processed (e.g., by the PSS 110 of FIG. 1).

FIG. 9 illustrates example graphical user interfaces of a mobile application for enabling various tipping flows, in accordance to some embodiments of the transaction flow technology. In accordance with the embodiments of FIG. 9, the various tipping flows are represented by a first graphical user interface 900, a second graphical user interface 902, and a third graphical user interface 904. The first graphical user interface 900 can be part of a transaction flow customized for a restaurant merchant, where the interface 900 presents a tipping flow customized for that merchant. In particular the tipping flow of the interface 900 presents predefined tipping amounts corresponding to parameters of the restaurant merchant. For example, the tipping amounts for a fine-dining establishment are set at 20%, 30%, or "Other." Upon the payer selecting one of the tipping amounts, the payment can be processed to include both the amount for, e.g., the restaurant meal, in addition to the tipping amount. That is, approval for both is completed in one step.

The second graphical user interface 902 can be part of a transaction flow customized for a quick-service merchant (e.g., a Tacos food truck), where the interface 902 presents a tipping flow customized for that merchant. In particular the tipping flow of the interface 902 presents predefined tipping amounts corresponding to parameters of the quick-service merchant. For example, the tipping amounts for a fine-dining establishment are set at "$1," "$3," or "no tip." Upon the payer selecting one of the tipping amounts, the payment can be processed to include both the amount for, e.g., the restaurant meal, in addition to the tipping amount. That is, approval for both is completed in one step.

The third graphical user interface 904 can be part of a transaction flow customized for another quick-service merchant (e.g., a delivery of goods), where the interface 904 presents a tipping flow customized for that merchant. In particular the tipping flow of the interface 904 presents a two-step process that is predefined to correspond to parameters of the quick-service merchant. In particular, the tipping flow presents tipping as separate from the actual payment for the transaction. This can be suitable, for example, a delivery service where the payer may want some time to decide whether to tip for delivery. The payer has the option of approving the payment first, and then adding the tip later. That is, approval for the two different payments (i.e., actual transaction payment and tipping payment) are completed in two steps.

Figure 10:
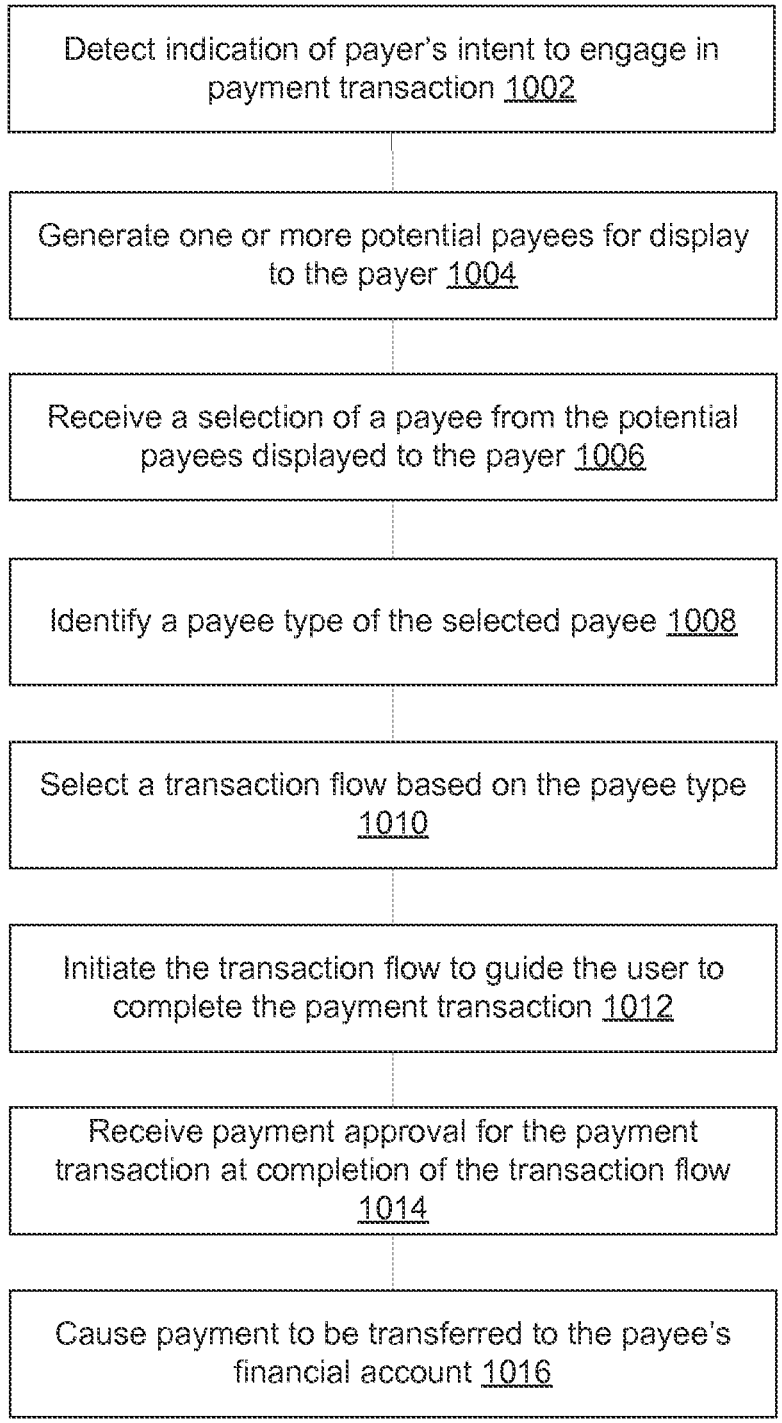
FIG. 10 is a flowchart illustrating a set of operations for customizing a transaction flow, in accordance to some embodiments of the transaction flow technology.

FIG. 10 is a flowchart illustrating a set of operations 1000 illustrating a set of operations for customizing a transaction flow, in accordance to some embodiments of the transaction flow technology. The set of operations 1000 is described below as being performed by a computer system. In some embodiments, the computer system can be the computer server system 300. In some embodiments, the computer system can be the PSS 110 of FIG. 1.

At operation 1002, the system detects an indication of a payer's intent to engage in a payment transaction. Such detection can be based on, for example, the system receiving a message from a mobile application executing on the payer's mobile device. The message can include information indicating that the payer has interacted with mobile application (e.g., launching the application or inputting a payee identifier). At operation 1004, the system generates a set of potential payees for display to the payer at the mobile application installed on the payer's mobile device. At operation 1006, the system receives from the mobile device (e.g., through the mobile application), the payer's selection of a payee from the set of potential payees. At operation 1008, the system identifies one or more parameters of the selected payee, such as a payee type.

At operation 1010, based on the payee type, the system selects one of multiple transaction flows as a particular transaction flow for initiation at the mobile application installed at the payer's mobile device. The multiple transaction flows can include, for example, a first transaction flow and a second transaction flow. The first transaction flow can correspond to a first payee type and the second transaction flow can correspond to a second payee type, where the first transaction flow is different from the second transaction flow. For example, the first transaction flow can be customized for a restaurant merchant while the second transaction flow can be customized for a professional service merchant.

At operation 1012, the system initiates the particular transaction flow at the mobile application for enabling the payer to complete the payment transaction with the payee. At operation 1014, the system receives an approval of a payment associated with the payment transaction with the payee. The approval can be received, for example, at a completion of the particular transaction flow. Alternatively, the approval can be received at the completion of a sub-flow of the particular transaction flow (e.g., before a tipping flow begins). At operation 1016, the system, based at least in part on the approval, transfers, or causes to be transferred, funds for the payment to a financial account associated with the payee.

Figure 11:
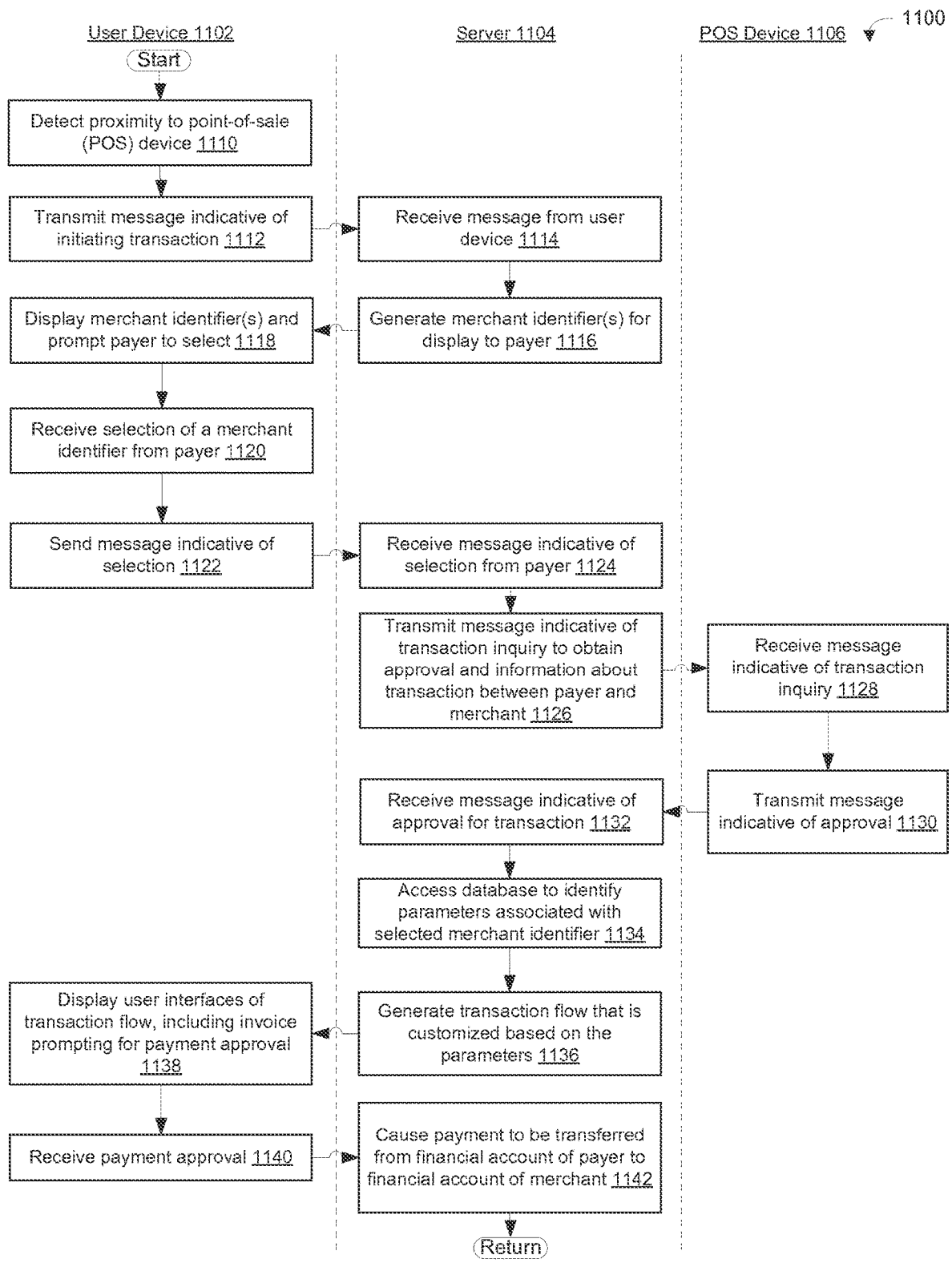
FIG. 11 is a flow diagram illustrating an example of a set of operations for customizing a tipping flow in connection with a particular transaction flow, in accordance to some embodiments of the transaction flow technology.

FIG. 11 is a flow diagram illustrating an example of a set of operations 1100 for customizing a tipping flow in connection with a particular transaction flow, in accordance to some embodiments of the transaction flow technology. The set of operations 1100 is described below with reference to a user device 1102, a server 1104, and a point-of-sale (POS) device 1106. In some embodiments, the user device 1102 can be a mobile device, such as the mobile device 102 of FIG. 1 or mobile device 200 of FIG. 2. In some embodiments, the server 1104 can be the computer server system 300 of FIG. 3 or the PSS 110 of FIG. 1. In some embodiments, the POS device 1106 can be a payee device, such as the payee device 120A of FIG. 1.

At operation 1110, the user device 1102 initiates a payment transaction responsive to detecting the user device 1102 being in proximity to the POS device 1106. Such detection can be based on BLE, Bluetooth, WiFi, and/or a geofence. At operation 1112, the user device 1102 transmits a message indicative of a request to initiate a payment transaction with the POS device 1106 to the server 1104. At operation 1114, the server 1104, receives the message and generates an identifier corresponding to that POS device 1106 (i.e., operation 1116) for display at the user device 1102. In some embodiments, the server 1104 also determines whether the payer is engaged in any active transaction with the POS device 1106. For example, the server 1104 transmits a message indicative of a transaction information inquiry directed to the POS device 1106, which responds with transaction information confirming the payer has an active transaction. Verification of the active transaction can be done, for example, based on identifying the payer identifier and association with an active transaction.

At operation 1118, the user device 1102 receives the payee identifier (i.e., merchant identifier) and displays it for the payer, prompting the payer to select it (if he/she wishes to make a payment). At operation 1120, the user device 1102 receives a selection of the merchant identifier indicating the payer wishes to make a payment to that merchant. At operation 1122, the user device 1102 transmits a message to the server 1104 with information indicating the selection. At operation 1124, the server 1104 receives that message. In some embodiments, the server 1104 transmits a message to the POS device 1106 to obtain approval and/or transaction information to process the payment request from the payer, as indicated in operation 1126. At (optional) operation 1126, the POS device 1106 receives the message and transmits a message of approval, as indicated in operation 1130. At (optional) operation 1132, the server 1104 receives the approval.

At operation 1134, the server 1104 accesses a database to identify parameters associated with the selected merchant identifier. At operation 1136, the server 1104 generates a transaction flow based on the parameters. In some embodiments, the transaction flow can include a customized tipping flow specifically unique to the POS device and/or merchant of the POS device 1106. The various tipping flows are discussed and illustrated in FIG. 9. At operation 1138, the transaction flow, along with customized tipping flow, is received at the user device 1102, which causes one or more user interfaces corresponding to that transaction flow to be displayed to the payer. At operation 1140, the user device 1102 receives a payment approval. At operation 1142, the server 1104 causes funds for the payment to be transferred from the financial account of the payer to the financial account of the payee (or merchant) associated with the POS device 1106.

Regarding the set of operations 1000 and 1100, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

Figure 12:
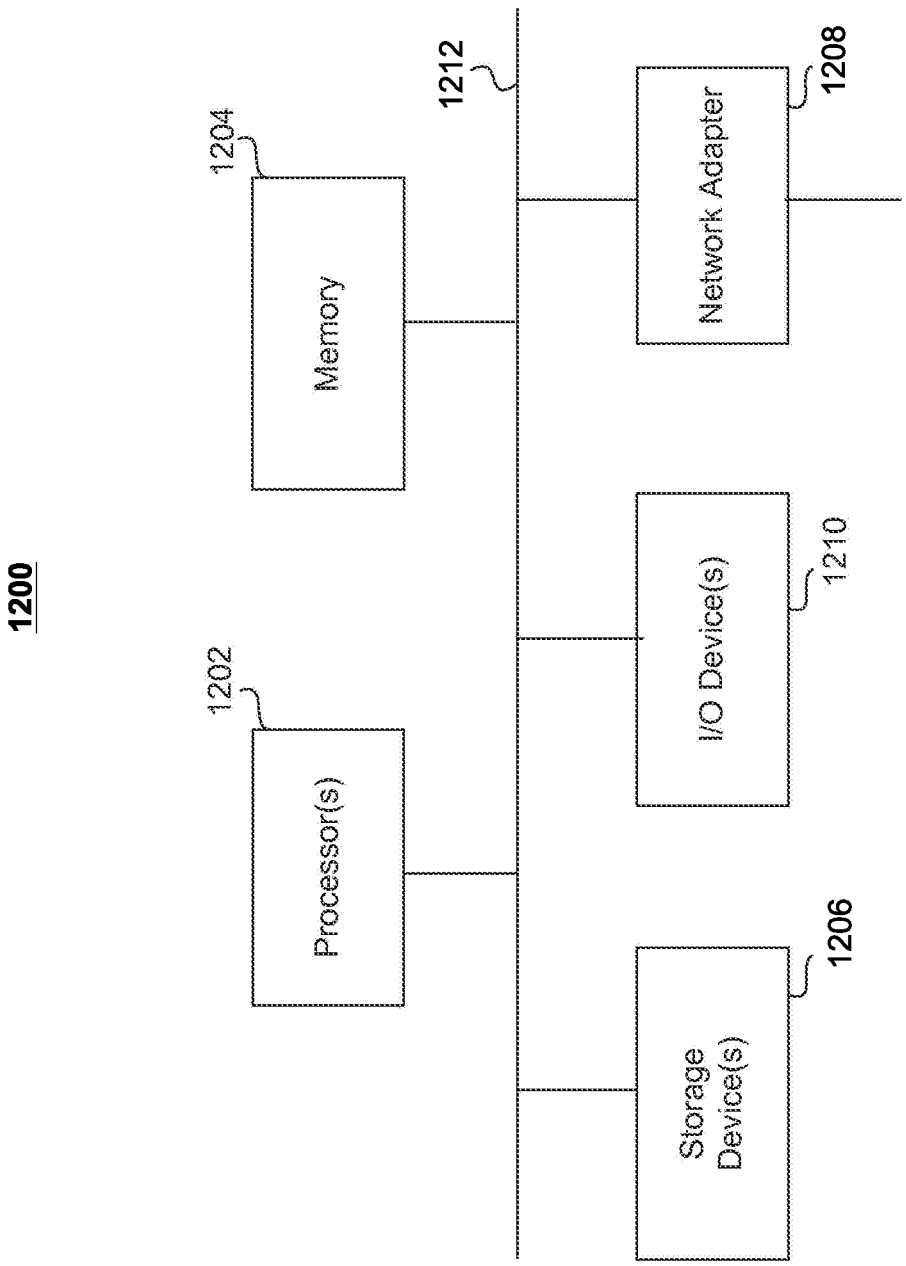
FIG. 12 illustrates an example of a processing computer system.

FIG. 12 illustrates at a high-level an example of the hardware architecture of a processing computer system 1200, which can be used to implement any of the processing devices referred to above, such as the mobile device 102, the mobile device 300, the user device 1102, the PSS 110, the payee device 1106, the server 1104, etc. Any of these devices each can include multiple instances of an architecture such as shown in FIG. 12 (i.e., multiple computers), particularly server-based systems, and such multiple instances can be coupled to each other via one or more networks.

In the illustrated embodiment, the processing system 1200 includes one or more processors 1202, memory 1204, one or more mass storage devices 1206, one or more input/output (I/O) devices 1208, and one or more communication device(s) 1210, all of which are coupled to one another through an interconnect 1212. The interconnect 1212 may be or include buses, point-to-point connections, adapters and/or other conventional connection devices.

The processor(s) 1202 can be or include, for example, one or more general-purpose programmable microprocessors, digital signal processors (DSPs), microcontrollers, application specific integrated circuits (ASICs), programmable gate arrays, or the like, or a combination of such devices. The processor(s) 1202 control the overall operation of the processing device 1200.

Memory 1204 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device (s) 1210 may be or include one or more hard drives, digital versatile disks (DVDs), flash memories, or the like. The memory 1204 and/or the mass storage device(s) 1206 can store (individually or collectively) data and instructions that configure the processor(s) 1202 to execute operations in accordance with the techniques described above.

The communication devices 1210 can be or include, for example, an Ethernet adapter, Wi-Fi adapter, cellular transceiver, Bluetooth or Bluetooth Low Energy (BLE) transceiver, or the like, or a combination thereof. Depending on the specific nature and purpose of the processing device 1200, the I/O devices 1210 can include devices such as a display (which may be a touch screen display), audio speaker, keyboard, mouse or other pointing device, microphone, camera, etc. Note that these I/O devices may be unnecessary, however, if the processing device 1200 is embodied solely as a server computer.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

What is claimed is:

1. A computer-implemented method comprising:
   in association with a transaction between a payor and a payee, determining, by a payment service system comprising one or more processors, a parameter associated with at least the payee, wherein the parameter is based at least in part on a Payee type of the payee;
   querying, by the payment service system comprising the one or more processors, an operations database of transaction flow operations utilizing the parameter to determine a set of operations of the transaction flow operations that are associated with the parameter, wherein the transaction flow operations are related to multiple parameters and the set of operations is indicated in the operations database as being associated with the parameter;
   dynamically determining, by the payment service system comprising the one or more processors and based on the querying, a customized transaction flow for the payee, wherein the customized transaction flow comprises a custom sequence of distinct operations to be performed in association with a sequence of user interfaces to complete the transaction; and sending, by the payment service system comprising the one or more processors, a command to a user device of the payor associated with the transaction, the command including data that causes, when received at the user device, a payment application on the user device to enable and present one or more user interfaces corresponding to one or more of the set of operations to be presented via the user device of the payor, the one or more user interfaces facilitating the set of operations.

2. The computer-implemented method of claim 1,
wherein dynamically determining the customized transaction flow comprises:
selecting a predetermined transaction flow from the transaction flow operations based at least in part on the parameter; and
modifying the predetermined transaction flow based at least in part on the parameter.

3. The computer-implemented method of claim 1,
wherein dynamically determining the customized transaction flow comprises deriving the set of operations from operations of a first predetermined transaction flow and a second predetermined transaction flow, and wherein the first predetermined transaction flow is different from the second predetermined transaction flow.

4. The computer-implemented method of claim 1,
further comprising modifying at least one operation of the set of operations based on preferences associated with at least one of the payee, the payor, or the transaction.

5. The computer-implemented method of claim 1,
further comprising modifying at least one user interface of the one or more user interfaces based on the parameter or preferences associated with at least one of the payee, the payor, or the transaction.

6. The computer-implemented method of claim 1,
further comprising:
receiving, via the one or more user interfaces, user input data in response to the set of operations; and
performing the transaction by executing at least one operation of the set of operations based at least in part on the user input data.

7. The computer-implemented method of claim 6,
further comprising: dynamically modifying the customized transaction flow for the payee based at least in part on the user input data, wherein modifying the customized transaction flow comprises adding an operation to the set of operations or removing the operation from the set of operations.

8. The computer-implemented method of claim 1,
wherein a first operation of the set of operations comprises presenting a payment amount associated with the transaction, and wherein a second operation of the set of operations comprises requesting a payment amount specified by the payor in association with the transaction, wherein the payment amount associated with the transaction and the payment amount specified by the payor are combined when processing the transaction.

9. The computer-implemented method of claim 1,
further comprising, in association with the transaction, identifying the payor or the payee based on determining a user device of the payee in proximity to the user device of the payor or determining the user device of the payor in proximity to the user device of the payee.

10. The computer-implemented method of claim 1,
further comprising receiving a request to execute the transaction between the payor and the payee, wherein the request is received from a payment service application executing on the user device associated with the payor or a user device associated with the payee.

11. One or more computer-readable non-transitory storage media comprising instructions operable when executed by one or more processors to perform operations comprising:
in association with a transaction between a payor and a payee, determining a parameter associated with at least the payee, wherein the parameter is based at least in part on a payee type of the payee;
querying an operations database of transaction flow operations utilizing the parameter to determine a set of operations of the transaction flow operations that are associated with the parameter, wherein the transaction flow operations are related to multiple parameters and the set of operations is indicated in the operations database as being associated with the parameter;
dynamically determining, based on the querying, a customized transaction flow for the payee, wherein the customized transaction flow comprises a custom sequence of distinct operations to be performed in association with a sequence of user interfaces to complete the transaction; and
sending a command to a user device of the payor associated with the transaction, the command including data that causes, when received at the user device, a payment application on the user device to enable and present one or more user interfaces corresponding to one or more of the set of operations to be presented via the user device of the payor, the one or more user interfaces facilitating the set of operations.

12. The one or more computer-readable non-transitory storage media of claim 11,
wherein dynamically determining the customized transaction flow comprises:
selecting a predetermined transaction flow from the transaction flow operations based at least in part on the parameter; and
modifying the predetermined transaction flow based at least in part on the parameter.

13. The one or more computer-readable non-transitory storage media of claim 11,
wherein dynamically determining the customized transaction flow comprises deriving the set of operations from operations of a first predetermined transaction flow and a second predetermined transaction flow, and wherein the first predetermined transaction flow is different from the second predetermined transaction flow.

14. The one or more computer-readable non-transitory storage media of claim 11,
wherein the instructions are further operable when executed by the one or more processors to perform operations further comprising modifying at least one operation of the set of operations based on preferences associated with at least one of the payee, the payor, or the transaction.

15. The one or more computer-readable non-transitory storage media of claim 11,
wherein the instructions are further operable when executed by the one or more processors to perform operations further comprising modifying at least one user interface of the one or more user interfaces based on the parameter or preferences associated at least one of with the payee, the payor, or the transaction.

16. A payment service computing platform comprising one or more processors and a memory coupled to the one or more processors comprising instructions executable by the one or more processors, the one or more processors being operable when executing the instructions to perform operations comprising:

in association with a transaction between a payor and a payee, determining a parameter associated with at least the payee, wherein the parameter is based at least in part on a payee type of the payee;

querying an operations database of transaction flow operations utilizing the parameter to determine a set of operations of the transaction flow operations that are associated with the parameter, wherein the transaction flow operations are related to multiple parameters and the set of operations is indicated in the operations database as being associated with the parameter;

dynamically determining, based on the querying, a customized transaction flow for the payee, wherein the customized transaction flow comprises a custom sequence of distinct operations to be performed in association with a sequence of user interfaces to complete the transaction; and sending a command to a user device of the payor associated with the transaction, the command including data that causes, when received at the user device, a payment application on the user device to enable and present one or more user interfaces corresponding to one or more of the set of operations to be presented via the user device of the payor, the one or more user interfaces facilitating the set of operations.

17. The payment service computing platform of claim 16, wherein dynamically determining the customized transaction flow comprises:

selecting a predetermined transaction flow from the transaction flow operations based at least in part on the parameter; and modifying the predetermined transaction flow based at least in part on the parameter.

18. The payment service computing platform of claim 16, wherein dynamically determining the customized transaction flow comprises deriving the set of operations from operations of a first predetermined transaction flow and a second predetermined transaction flow, and wherein the first predetermined transaction flow is different from the second predetermined transaction flow.

19. The payment service computing platform of claim 16, wherein the one or more processors are further operable when executing the instructions to perform operations further comprising modifying at least one operation of the set of operations based on preferences associated with at least one of the payee, the payor, or the transaction.

20. The payment service computing platform of claim 16, wherein the one or more processors are further operable when executing the instructions to perform operations further comprising modifying at least one user interface of the one or more user interfaces based on the parameter or preferences associated with at least one of the payee, the payor, or the transaction.

* * * * *